US009212792B2

(12) United States Patent
Wronski

(10) Patent No.: US 9,212,792 B2
(45) Date of Patent: Dec. 15, 2015

(54) SYSTEMS, METHODS, AND DEVICES PROVIDING A QUICK-RELEASE MECHANISM FOR A MODULAR LED LIGHT ENGINE

(71) Applicant: Grzegorz Wronski, Peachtree City, GA (US)

(72) Inventor: Grzegorz Wronski, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/092,603

(22) Filed: Nov. 27, 2013

(65) Prior Publication Data

US 2014/0153260 A1 Jun. 5, 2014

Related U.S. Application Data

(63) Continuation of application No. 13/237,094, filed on Sep. 20, 2011, now Pat. No. 8,596,837, which is a continuation-in-part of application No. 12/838,774, filed on Jul. 19, 2010, now Pat. No. 8,567,987.

(Continued)

(51) Int. Cl.
*B60Q 1/06* (2006.01)
*F21K 99/00* (2010.01)

(Continued)

(52) U.S. Cl.
CPC ... *F21K 9/30* (2013.01); *F21V 7/00* (2013.01); *F21V 15/01* (2013.01); *F21V 17/14* (2013.01); *F21V 19/0055* (2013.01); *F21V 23/06* (2013.01); *F21V 29/004* (2013.01); *F21V 29/713* (2015.01); *F21V 29/74* (2015.01);

(Continued)

(58) Field of Classification Search
CPC ........................ F21V 19/0045; F21V 19/0035
USPC .................................... 362/249.02, 655, 374
See application file for complete search history.

(56) References Cited

U.S. PATENT DOCUMENTS

| | | | |
|---|---|---|---|
| 1,197,187 | A | 9/1916 | Crownfield |
| 1,281,752 | A | 10/1918 | Bailey |

(Continued)

FOREIGN PATENT DOCUMENTS

| | | |
|---|---|---|
| CN | 1793719 | 6/2006 |
| CN | 2791469 | 6/2006 |

OTHER PUBLICATIONS

Cooper Lighting's Complaint for Patent Infringement; United States District Court Central District of California Western Division; CV12 0523 dated Jan. 19, 2012.

(Continued)

*Primary Examiner* — Evan Dzierzynski
(74) *Attorney, Agent, or Firm* — King & Spalding LLP

(57) ABSTRACT

A light emitting diode module is removably coupled to a heat sink with screws and includes slots configured to receive at least a portion of the screw therethrough, the width of the slot being greater than the thread-width of the screw but less than the width of the screw head. Some slots also include a keyhole having a diameter greater than the width of the screw head. For embodiments without keyholes, the module is coupled to a heat sink by loosening the screws, sliding them into the slots, and tightening the screws to hold the LED module in place. For embodiments with one or more keyholes, the keyhole is vertically aligned with the screw, the module is moved down over the screw, and the screw is moved into the narrower portion of the slot. Then, the screws are tightened to hold the module in place against the heat sink.

20 Claims, 26 Drawing Sheets

Related U.S. Application Data

(60) Provisional application No. 61/384,546, filed on Sep. 20, 2010, provisional application No. 61/332,731, filed on May 7, 2010, provisional application No. 61/227,333, filed on Jul. 21, 2009.

(51) Int. Cl.

| | |
|---|---|
| ***F21V 29/00*** | (2015.01) |
| ***F21V 7/00*** | (2006.01) |
| ***F21V 15/01*** | (2006.01) |
| ***F21V 17/14*** | (2006.01) |
| ***F21V 19/00*** | (2006.01) |
| ***F21V 23/06*** | (2006.01) |
| ***F21V 29/71*** | (2015.01) |
| ***F21V 29/74*** | (2015.01) |
| ***F21V 29/77*** | (2015.01) |
| *F21Y 101/02* | (2006.01) |
| *F21Y 105/00* | (2006.01) |
| *F21V 27/02* | (2006.01) |

(52) U.S. Cl.
CPC ............... *F21V29/773* (2015.01); *F21V 27/02* (2013.01); *F21Y 2101/02* (2013.01); *F21Y 2105/001* (2013.01); *Y10T 29/49117* (2015.01)

(56) References Cited

U.S. PATENT DOCUMENTS 1,447,238 A 3/1923 Crownfield
1,711,478 A 4/1929 Cromwell
1,821,733 A 9/1931 Thibodeau
2,802,933 A 8/1957 Broadwin
3,040,172 A 6/1962 Chan
4,091,444 A * 5/1978 Mori ............................ 362/374
4,313,154 A 1/1982 Capostagno et al.
4,336,575 A 6/1982 Gilman
4,388,677 A 6/1983 Druffel
4,399,497 A 8/1983 Druffel
4,475,147 A 10/1984 Kristofek
4,511,113 A 4/1985 Druffel et al.
4,729,080 A 3/1988 Fremont et al.
4,803,603 A 2/1989 Carson
4,829,410 A 5/1989 Patel
4,930,054 A 5/1990 Krebs
4,972,339 A 11/1990 Gabrius
5,057,979 A 10/1991 Carson et al.
5,073,845 A 12/1991 Aubrey
5,075,831 A 12/1991 Stringer et al.
5,130,913 A 7/1992 David
5,222,800 A 6/1993 Chan et al.
5,374,812 A 12/1994 Chan et al.
5,452,816 A 9/1995 Chan et al.
5,457,617 A 10/1995 Chan et al.
5,505,419 A 4/1996 Gabrius
5,597,234 A 1/1997 Winkelhake
5,662,414 A 9/1997 Jennings et al.
5,673,997 A 10/1997 Akiyama
5,690,423 A 11/1997 Hentz et al.
5,738,436 A 4/1998 Cummings et al.
5,746,507 A 5/1998 Lee
5,758,959 A 6/1998 Sieczkowski
5,826,970 A 10/1998 Keller et al.
5,857,766 A 1/1999 Sieczkowski
5,951,151 A 9/1999 Doubeck et al.
5,957,573 A 9/1999 Wedekind et al.
5,957,574 A 9/1999 Hentz et al.
6,030,102 A 2/2000 Gromotka
6,082,878 A 7/2000 Doubek et al.
6,152,583 A 11/2000 Langner
6,203,173 B1 3/2001 Duff et al.
6,286,265 B1 9/2001 Rinderer
6,343,871 B1 2/2002 Yu
6,343,873 B1 2/2002 Eberhard et al.
6,364,511 B1 4/2002 Cohen
6,431,723 B1 8/2002 Schubert et al.
6,461,016 B1 10/2002 Jamison et al.
6,505,960 B2 1/2003 Schubert et al.
6,520,655 B2 2/2003 Chuchi
6,554,457 B1 4/2003 Platt
6,578,983 B2 6/2003 Holten
6,636,003 B2 10/2003 Rahm et al.
6,726,347 B2 4/2004 Wronski
6,787,999 B2 9/2004 Stimac et al.
6,853,151 B2 2/2005 Leong et al.
6,976,769 B2 12/2005 McCullough et al.
7,011,430 B2 3/2006 Chen
7,018,070 B2 3/2006 McCoy
7,021,486 B1 * 4/2006 Hurlbut ......................... 220/379
7,144,135 B2 12/2006 Martin et al.
7,213,940 B1 5/2007 Van De Ven et al.
7,374,308 B2 5/2008 Sevack et al.
7,396,146 B2 7/2008 Wang
7,503,672 B2 3/2009 Ho
7,524,089 B2 4/2009 Park
7,568,817 B2 8/2009 Lee et al.
7,658,517 B2 2/2010 Czech et al.
7,670,021 B2 3/2010 Chou
7,670,028 B2 3/2010 Liu et al.
7,722,227 B2 5/2010 Zhang et al.
7,744,259 B2 6/2010 Walczak et al.
7,784,969 B2 8/2010 Reisenauer et al.
7,959,329 B2 6/2011 Van De Ven
7,959,332 B2 6/2011 Tickner et al.
7,967,480 B2 6/2011 Pickard et al.
7,993,034 B2 8/2011 Wegner
2004/0066142 A1 4/2004 Stimac et al.
2004/0240182 A1 12/2004 Shah
2005/0068771 A1 3/2005 You et al.
2005/0068776 A1 3/2005 Ge
2005/0174780 A1 8/2005 Park
2005/0183344 A1 8/2005 Ziobro et al.
2006/0215422 A1 9/2006 Laizure et al.
2007/0139923 A1 6/2007 Negley et al.
2007/0279903 A1 12/2007 Negley et al.
2008/0080189 A1 4/2008 Wang
2008/0084701 A1 4/2008 Van De Ven et al.
2008/0106895 A1 5/2008 Van De Ven et al.
2008/0106907 A1 5/2008 Trott et al.
2008/0112168 A1 5/2008 Pickard et al.
2008/0112170 A1 5/2008 Trott et al.
2008/0112171 A1 5/2008 Patti et al.
2008/0123362 A1 5/2008 Thorneycroft et al.
2008/0130298 A1 6/2008 Negley et al.
2008/0137347 A1 6/2008 Trott et al.
2008/0165535 A1 7/2008 Mazzochette
2008/0285271 A1 11/2008 Roberge et al.
2008/0304269 A1 12/2008 Pickard et al.
2009/0073688 A1 3/2009 Patrick
2009/0073689 A1 3/2009 Patrick
2009/0080189 A1 3/2009 Wegner et al.
2009/0086476 A1 4/2009 Tickner et al.
2009/0086481 A1 4/2009 Wegner et al.
2009/0086487 A1 4/2009 Ruud et al.
2009/0129086 A1 5/2009 Thompson et al.
2009/0154166 A1 6/2009 Zhang et al.
2009/0262530 A1 10/2009 Tickner et al.
2009/0290343 A1 11/2009 Brown et al.
2009/0290361 A1 11/2009 Ruud et al.
2010/0061108 A1 3/2010 Zhang et al.
2010/0085766 A1 4/2010 Czech et al.
2010/0110699 A1 5/2010 Chou
2010/0328960 A1 * 12/2010 Wang ........................... 362/373

OTHER PUBLICATIONS

Report on the filing or determination of an action regarding a Patent or Trademark; Form AO 120; CV 12 0523 dated Jan. 19 2012.

PCT Search Report, Written Opinion for PCT/US2008/077212 mailed Nov. 24, 2008.

Cree LED Lighting Product Description; 6 Recessed downlight; LR6; Jul. 2009.

(56) References Cited

OTHER PUBLICATIONS

Cree Press Release "LED Lighting Fixtures Announces Its First LED-Based Recessed Down Light" Feb. 7, 2007.
Cree Press Release "Award Winning Custom Home Builder Chooses LED Lighting Fixtures" Mar. 20, 2007.
Cree Press Release "LED Lighting Fixtures Announces New Commercial Opportunity for LR6 Down-light" May 3, 2007.
Cree Press Release "University of Arkansas to Install LED Lighting Fixture's Downlights" Jun. 25, 2007.
Cree Press Release "LED Lighting Fixtures Inc. achieves unprecedented gain in light output from new luminaire" Apr. 26, 2006.
Cree Press Release Cree LR LED^ Light Wins Silver International Design Excellence Award (IDEA) Jul. 18, 2008.
Lighting for Tomorrow 2007 Winners Announced; Sep. 11, 2007.
Office Action mailed Mar. 26, 2012 for U.S. Appl. No. 12/235,146.
Request for Continued Examination filed Jan. 16, 2012 for U.S. Appl. No. 12/235,146.
Advisory Action mailed Jan. 6, 2012 for U.S. Appl. No. 12/235,146.
After Final Response filed Dec. 19, 2011 for U.S. Appl. No. 12/235,146.
Final Office Action mailed Oct. 18, 2011 for U.S. Appl. No. 12/235,146.
Response filed Jul. 15, 2011 for U.S. Appl. No. 12/235,146.
Office Action mailed Mar. 15, 2011 for U.S. Appl. No. 12/235,146.
Response filed Jan. 5, 2011 for U.S. Appl. No. 12/235,146.
Office Action mailed Oct. 6, 2010 for U.S. Appl. No. 12/235,146.
Office Action mailed Mar. 24, 2010 for U.S. Appl. No. 12/235,127.
Response filed Jun. 24, 2010 for U.S. Appl. No. 12/235,127.
Final Office Action mailed Jul. 30, 2010 for U.S. Appl. No. 12/235,127.
Request for Continued Examination filed Nov. 30, 2010 for U.S. Appl. No. 12/235,127.
Notice of Allowance mailed Feb. 4, 2011 for U.S. Appl. No. 12/235,127.
Office Action mailed Feb. 1, 2011 for U.S. Appl. No. 12/235,141.
Interview Summary mailed Jun. 3, 2011 for U.S. Appl. No. 12/235,141.
Interview Summary mailed Jun. 21, 2011 for U.S. Appl. No. 12/235,141.
Response filed Jul. 1, 2011 for U.S. Appl. No. 12/235,141.
Office Action mailed Oct. 18, 2011 for U.S. Appl. No. 12/235,141.
Response filed Jan. 18, 2012 for U.S. Appl. No. 12/235,141.
Office Action for U.S. Appl. No. 12/235,146 mailed on Oct. 9, 2012.
Office Action for Israeli Patent Application No. 204616 mailed Sep. 19, 2012.
Office Action for U.S. Appl. No. 12/235,141 mailed on Apr. 6, 2012.
International Search Report filed in PCT/US2010/042442; mailed Dec. 31, 2010.
Office Action for U.S. Appl. No. 13/431,439 mailed Jun. 19, 2012.

* cited by examiner

SYSTEMS, METHODS, AND DEVICES PROVIDING A QUICK-RELEASE MECHANISM FOR A MODULAR LED LIGHT ENGINE

RELATED PATENT APPLICATIONS

This application is a continuation of and claims priority to U.S. patent application Ser. No. 13/237,094, filed on Sep. 20, 2011, and titled "Systems, Methods, and Devices Providing A Quick-Release Mechanism for a Modular LED Light Engine," which claims priority to U.S. Provisional Patent Application Ser. No. 61/384,546, filed Sep. 20, 2010, and titled "Systems, Methods, and Devices Providing a Quick-Release Mechanism for a Modular LED Light Engine," and is also a continuation-in-part of and claims priority to U.S. patent application Ser. No. 12/838,774, filed on Jul. 19, 2010, and titled "Interfacing a Light Emitting Diode (LED) Module to a Heat Sink Assembly, a Light Reflector and Electrical Circuits," which claims priority to U.S. Provisional Patent Application Ser. No. 61/332,731, filed May 7, 2010, and titled "Systems, Methods and Devices for a Modular LED Light Engine," and U.S. Provisional Patent Application Ser. No. 61/227,333, filed Jul. 21, 2009, and titled "LED Module Interface for a Heat Sink and a Reflector." The entire contents of all of the above are hereby incorporated herein by reference for all purposes.

TECHNICAL FIELD

The present invention relates to an apparatus and methods of manufacture for a light emitting diode ("LED") device. More specifically, the invention relates to apparatus and methods for removably coupling a light emitting diode (LED) module to a heat sink and/or a reflector.

BACKGROUND

LEDs offer benefits over incandescent and fluorescent lights as sources of illumination. Such benefits include high energy efficiency and longevity. To produce a given output of light, an LED consumes less electricity than an incandescent or a fluorescent light, and, on average, the LED will last longer before requiring replacement.

The level of light a typical LED outputs depends upon the amount of electrical current supplied to the LED and upon the operating temperature of the LED. That is, the intensity of light emitted by an LED changes according to electrical current and LED temperature. Operating temperature also impacts the usable lifetime of most LEDs.

As a byproduct of converting electricity into light, LEDs generate heat that can raise the operating temperature if allowed to accumulate, resulting in efficiency degradation and premature failure. The conventional technologies available for handling and removing this heat are generally limited in terms of performance and integration. For example, conventional thermal interfaces between and LED and a heat sink are typically achieved by attaching LED modules to a flat surface of a heat sink. Methods for attaching the LED modules include soldering, adhesives, and fasteners. Using solder or adhesives typically prevents or severely limits the ability for a user to replace the LED module in situations where it is defective, worn out, or where improved replacements are available. With regard to fasteners, the difficulty is in maintaining control over the tools, the LED module being removed and the LED module being added. Such a task typically requires more than two hands. Otherwise the person replacing the LED module increase the risk of dropping one or both of the LED modules, which further risks the safety of anyone below the light fixture and which also risks permanent damage to the LED modules.

SUMMARY

For one aspect of the embodiments disclosed herein, an illumination apparatus can include a light emitting diode (LED) module. The LED module can include an outer housing having a multiple elongated slots that extend along a front surface of the outer housing. The elongated slots can extend through the outer housing and provide a passageway through the LED modules. Each of the elongated slots can also be configured to receive a portion of a screw through the slot. The illumination apparatus can also include a thermally conduct back side. Further, the illumination apparatus can include a substrate positioned within the bounds of the outer housing. In addition, one or more LEDs can be disposed on the substrate.

For another aspect of the embodiments disclosed herein, a method of removing a LED module removably coupled to a heat sink can include the step of loosening a first screw coupled to the heat sink and disposed through a first arcuate slot of the LED modules. The first arcuate slot can include a first keyhole positioned along a first end thereof. The method can also include the step of loosening a second screw coupled to the heat sink and disposed through a second arcuate slot of the LED module. The second arcuate slot can also include a second keyhole positioned along a first end thereof. The method can also include the step of rotating the LED module along a surface of the heat sink while the first and second screws remain coupled to the heat sink until the first screw engages the first keyhole and the second screw engages the second keyhole. The LED module can be lifted off of the surface of the heat sink in a substantially perpendicular direction such that a head of the first screw passes through the first keyhole and a head of the second screw passes through the second keyhole.

For yet another aspect of the embodiments disclosed herein, a method of removing a LED module removably coupled to a heat sink can include the step of providing an LED module having an outer housing with a front surface and a substrate positioned within the outer housing and having at least one LED. The method can also include the step of loosening a first screw coupled to the heat sink and disposed through a first linear slot of the LED module, the first linear slot having a first keyhole along a first end of the first linear slot. The method can also include the step of loosening a second screw coupled to the heat sink and disposed through a second linear slot of the LED module. The second linear slot can extend from an interior position along the front surface of the outer housing of the LED module and through an outer perimeter of the outer housing. The LED module is slid along the surface of the heat sink until the first screw engages the first keyhole and the second screw exits the second slot through the outer perimeter of the outer housing of the LED module. In addition the method can include the step of lifting the LED module off of the surface of the heat sink in a substantially perpendicular manner so that a head of the first screw passes through the first keyhole.

BRIEF DESCRIPTION OF THE DRAWINGS

For a more complete understanding of the present invention and the advantages thereof, reference is now made to the following description, in conjunction with the accompanying figures briefly described as follows.

Figure 1:
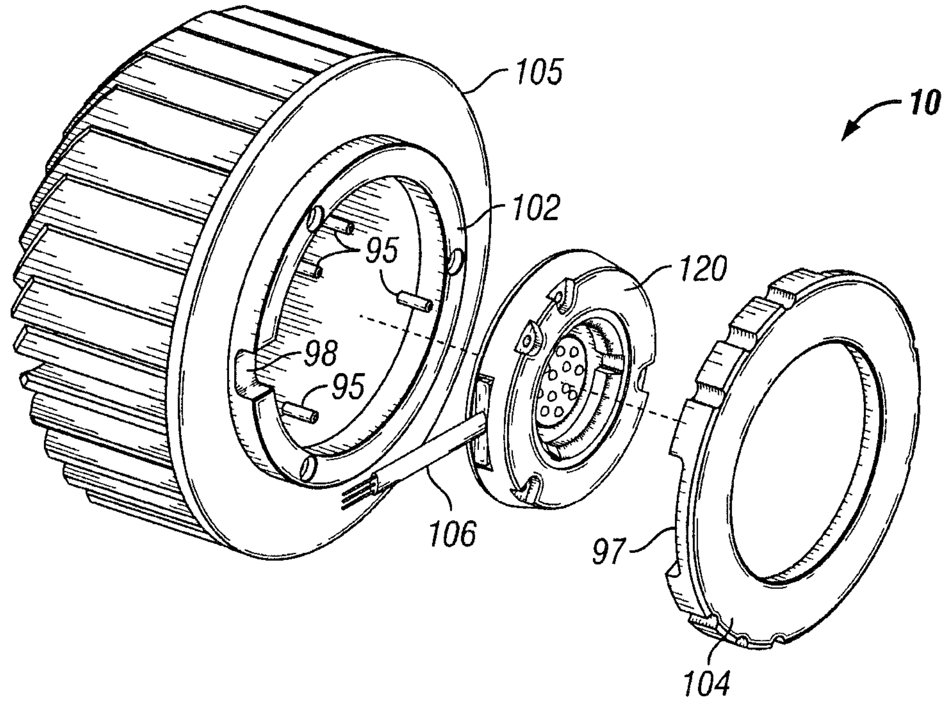
FIG. 1 illustrates an exploded view of a modular LED device comprising a heat sink, a mounting ring, a LED light engine module with electrical leads, and a locking ring, according to an exemplary embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Referring now to the drawings, details of example embodiments of the present invention are schematically illustrated. Like elements in the drawings will be represented by like numbers, and similar elements will be represented by like numbers with a different lower case letter suffix.

Referring to FIG. 1, depicted is a schematic exploded perspective view of a modular LED device comprising a heat sink, a mounting ring, a LED light engine module with electrical leads, and a locking ring, according to a specific example embodiment of this disclosure. An LED device, generally represented by the numeral 10, comprises a back heat sink 105, a mounting ring 102, an LED module 120, electrical wiring 106, and a locking ring 104. An opening 98 in the mounting ring 102 and an opening 97 in the locking ring 104 allow exit of the electrical wiring 106 when the mounting ring 102 and locking ring 104 are assembled together with the LED module 120 located therebetween. The locking ring 104 holds the LED module 120 in the mounting ring 102 so that the back of the LED module 120 is in thermal communication with the face of the back heat sink 105. The locking ring 104 allows quick release of the LED module 120 from the mounting ring 102 without requiring special tools or much effort. This is especially important when changing out the LED module 120 in a light fixture mounted in or on a high ceiling while standing on a ladder and the like. In addition, the locking ring 104 provides a generally constant controlled pressure on the LED module 120 to maintain thermal communication between the module 120 and the heat sink 105.

Figure 2:
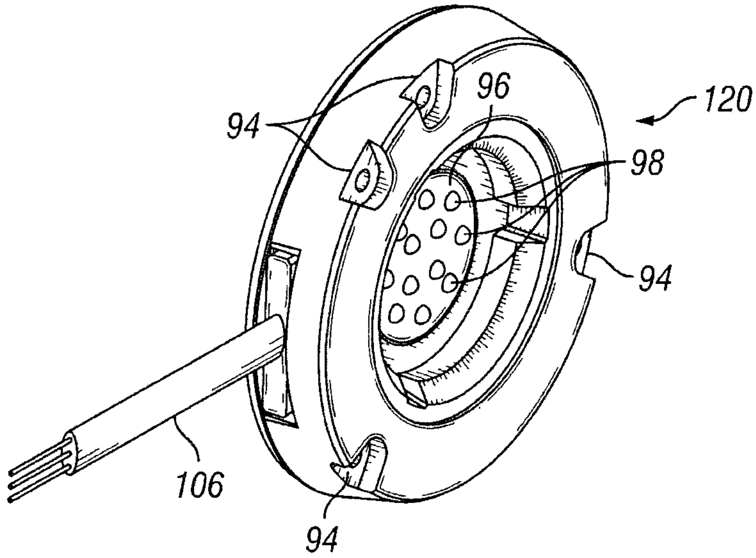
FIG. 2 illustrates a schematic perspective view of the LED light engine module with electrical leads as shown in FIG. 1.

Referring to FIG. 2, depicted is a schematic perspective view of the LED light engine module with electrical leads as shown in FIG. 1. The LED module 120 comprises a plurality of light emitting diodes (LEDs) 98 mounted on a substrate 96 having electrical connections (not shown) to the plurality of LEDs 98 and to the electrical wiring 106. Position/key holes 94 are used in combination with a plurality of position/key pins 95 (FIG. 1) on the face of the heat sink 105 for preventing a mismatch of the power dissipation requirements of the LED module 120 with the heat sink 105 having an adequate heat dissipating rating, as more fully described hereinafter.

Figure 3:
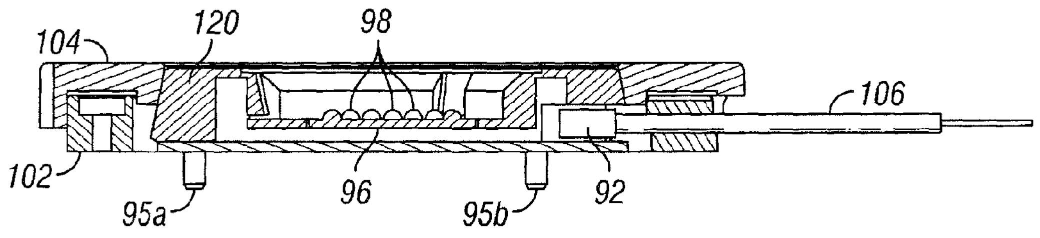
FIG. 3 illustrates a schematic elevational view of the LED light engine module with electrical leads as shown in FIGS. 1 and 2.

Referring to FIG. 3, depicted is a schematic elevational view of the LED light engine module with electrical leads as shown in FIGS. 1 and 2. The LED module 120 is held between the mounting ring 102 and the locking ring 104. The electrical wiring 106 is attached to the LED substrate 96 with an electrical connector 92. The connector 92 is electrically connected to the electrical wiring 106 that provides electrical power and control to, and, optionally, parameter monitoring from, the LED module 120. At least one position pin **95*a* and at least one lumen package key pin 95*b* comprise the plurality of position/key pins 95**.

Figure 4:
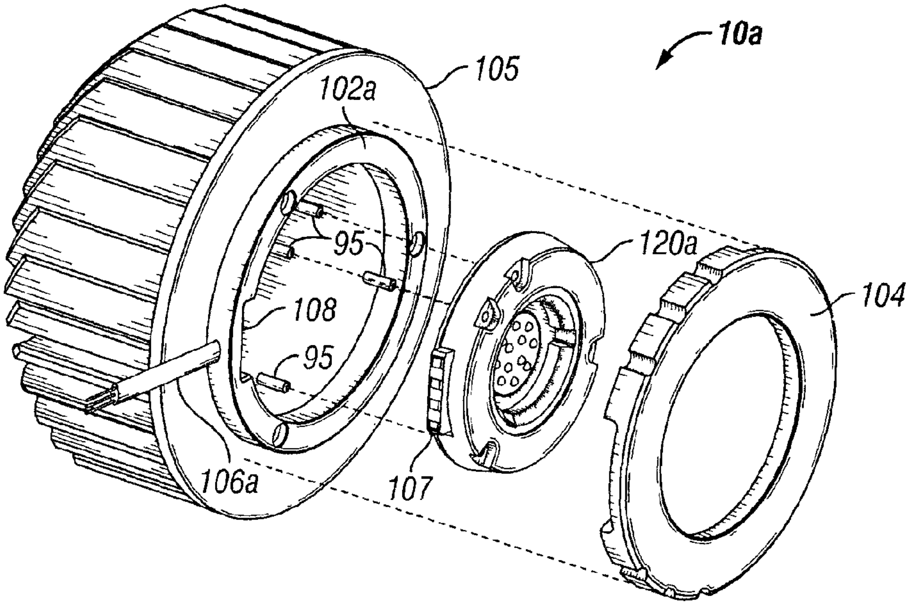
FIG. 4 illustrates a schematic exploded perspective view of a modular LED device comprising a heat sink, a mounting ring, a LED light engine module with integrated electrical contacts, and a locking ring, according to another specific example embodiment of this disclosure.

Referring to FIG. 4, depicted is a schematic exploded perspective view of a modular LED device comprising a heat sink, a mounting ring, a LED light engine module with integrated electrical contacts, and a locking ring, according to another specific example embodiment of this disclosure. An LED device, generally represented by the numeral **10*a*, comprises a back heat sink 105, a mounting ring 102*a*, an LED module 120*a*, electrical wiring 106*a*, and a locking ring 104. The LED module 120*a* has a connector 107 with electrical contacts thereon. The mounting ring 102*a* has a corresponding connector 108 that electrically connects to the connector 107 when the LED device 10*a* is inserted into mounting ring 102*a*. The locking ring 104 holds the LED module 120*a* in the mounting ring 102*a* so that the back of the LED module 120*a* is in thermal communication with the face of the back heat sink 105. The locking ring 104 allows quick release of the LED module 120*a* from the mounting ring 102*a* without requiring special tools or much effort. This is especially important when changing out the LED module 120*a*** in a light fixture mounted in or on a high ceiling while standing on a ladder and the like.

Figure 5:
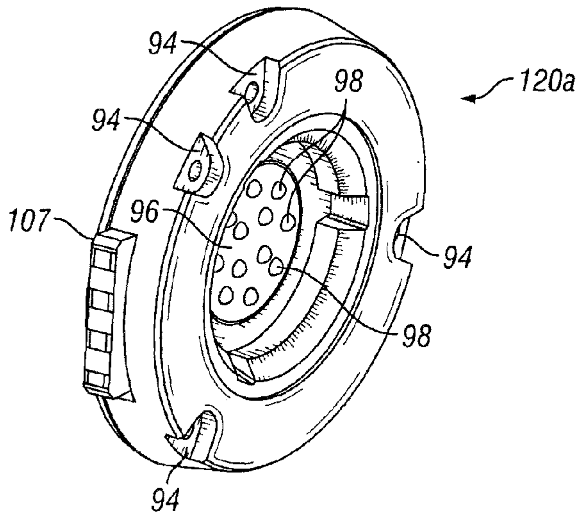
FIG. 5 illustrates a schematic perspective view of the LED light engine module with integrated electrical contacts as shown in FIG. 4.

Referring to FIG. 5, depicted is a schematic perspective view of the LED light engine module with integrated electrical contacts as shown in FIG. 4. The LED module **120*a* comprises a plurality of light emitting diodes (LEDs) 98 mounted on a substrate 96 having electrical connections (not shown) to the plurality of LEDs 98 and to the connector 107. Position/key holes 94 are used in combination with a plurality of position/key pins 95 (FIG. 4) in the heat sink 105 for preventing a mismatch of the power dissipation requirements of the LED module 120*a* with the heat sink 105** having an adequate heat dissipating rating, as more fully described hereinafter.

Figure 6:
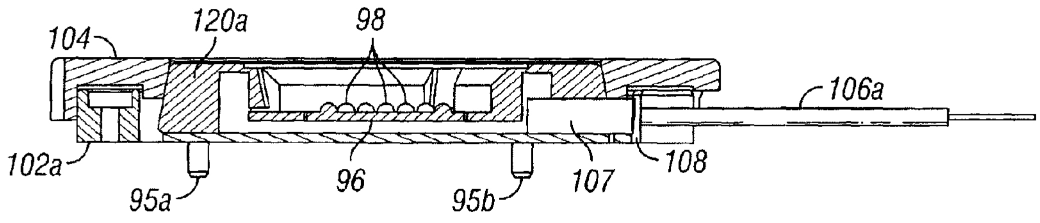
FIG. 6 illustrates a schematic elevational view of the LED light engine module having integrated electrical contacts as shown in FIGS. 4 and 5.

Referring to FIG. 6, depicted is a schematic elevational view of the LED light engine module having integrated electrical contacts as shown in FIGS. 4 and 5. The LED module **120*a* is held between the mounting ring 102*a* and the locking ring 104. The connector 107 has electrical contacts that provide electrical circuits through the LED substrate 96 to the LEDs 98. The connector 107 is adapted to electrically connect to a corresponding connector 108 in the mounting ring 102*a*. The connector 108 is electrically connected to electrical wiring 106*a* that provides electrical power and control to, and, optionally, parameter monitoring from, the LED module 120*a*. At least one position pin 95*a* and at least one lumen package key pin 95*b* comprise the plurality of position/key pins 95**.

Figure 7:
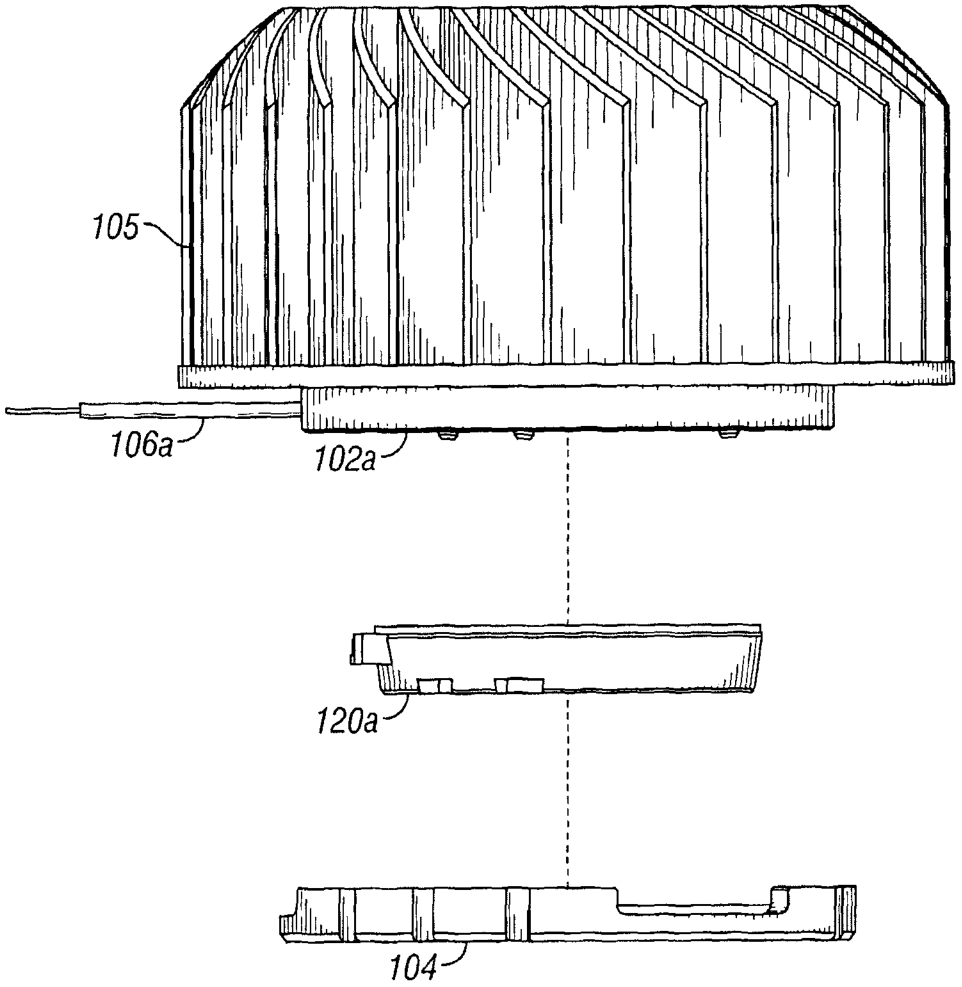
FIG. 7 illustrates a generic schematic exploded elevational view of the modular LED device shown in FIG. 4.

Referring to FIG. 7, depicted is a generic schematic exploded elevational view of the modular LED device shown in FIG. 4. Typically, the back heat sink 105 and mounting ring **102*a* are permanently mounted in the light fixture (not shown), wherein the LED module 120*a* and locking ring 104 are adapted for easy assembly and disassembly from the mounting ring 102*a*** without tools or great effort. This feature is extremely important for maintenance and safety purposes.

It is contemplated and within the scope of this disclosure that a thermal interface material, e.g., thermal grease, a thermally conductive compressible material, etc. can be used to improve heat transfer between the face of the back heat sink 105 and the back of the LED module 120.

Figure 8:
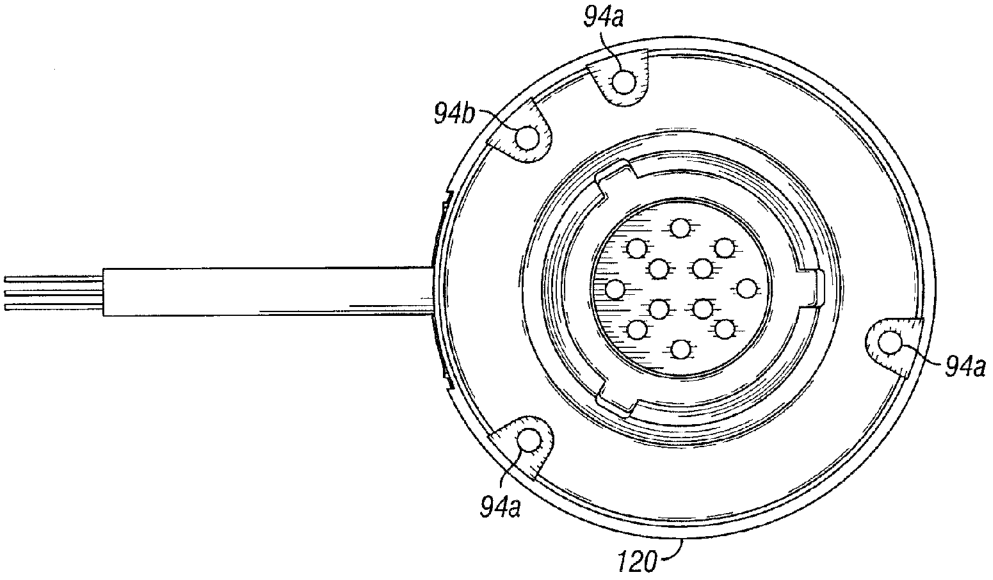
FIG. 8 illustrates a schematic plan view of a high lumen package light engine, according to a specific example embodiment of this disclosure.

Referring to FIG. 8, depicted is a schematic plan view of a high lumen package light engine module, according to a specific example embodiment of this disclosure. A high lumen package LED module 120 is shown having three (3) position holes **94*a* and one (1) key hole 94*b* located at specific positions in the LED modules 120 and 120*a*. The position hole(s) 94*a* and key hole(s) 94*b* are arranged as a specific number of holes having specific positional relationships. In addition, the inside diameters of the position holes 94*a* and the key holes 94*b* may also be different so as to better distinguish the LED module 120 rating. The key/position holes 94 fit over corresponding key/position pins 95 located on the face of the back heat sink 105. A purpose of proper mating of the key/position holes 94 and corresponding key/position pins 95 is to prevent attachment of a LED module 120 to a back heat sink 105 having inadequate capabilities needed to dissipate the heat from the LED module 120**.

Figure 9:
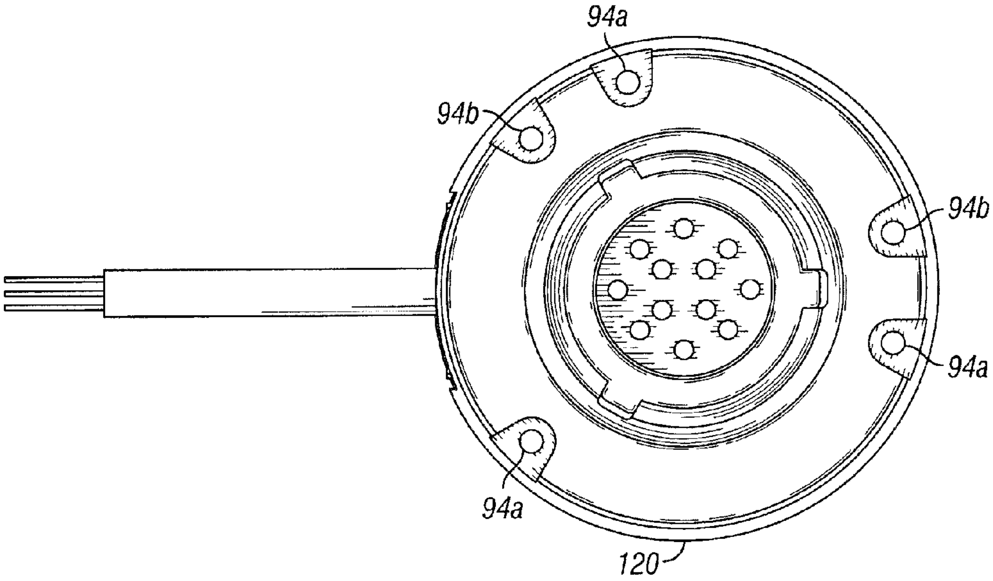
FIG. 9 illustrates a schematic plan view of a medium lumen package light engine, according to another specific example embodiment of this disclosure.

Referring to FIG. 9, depicted is a schematic plan view of a medium lumen package light engine module, according to another specific example embodiment of this disclosure. A medium lumen package LED module 120 is shown having three (3) position holes **94*a* and two (2) key holes 94*b* located at specific positions in the LED module 120 and 120*a*. The position hole(s) 94*a* and key hole(s) 94*b* are arranged as a specific number of holes having specific positional relationships. In addition, the inside diameters of the position holes 94*b* and the key holes 94*a* may also be different so as to better distinguish the LED module 120 rating. The key/position holes 94 fit over corresponding key/position pins 95 located on the face of the back heat sink 105. A purpose of proper mating of the key/position holes 94 and corresponding key/position pins 95 is to prevent attachment of a LED module 120 to a back heat sink 105 having inadequate capabilities needed to dissipate heat from the LED module 120**.

Figure 10:
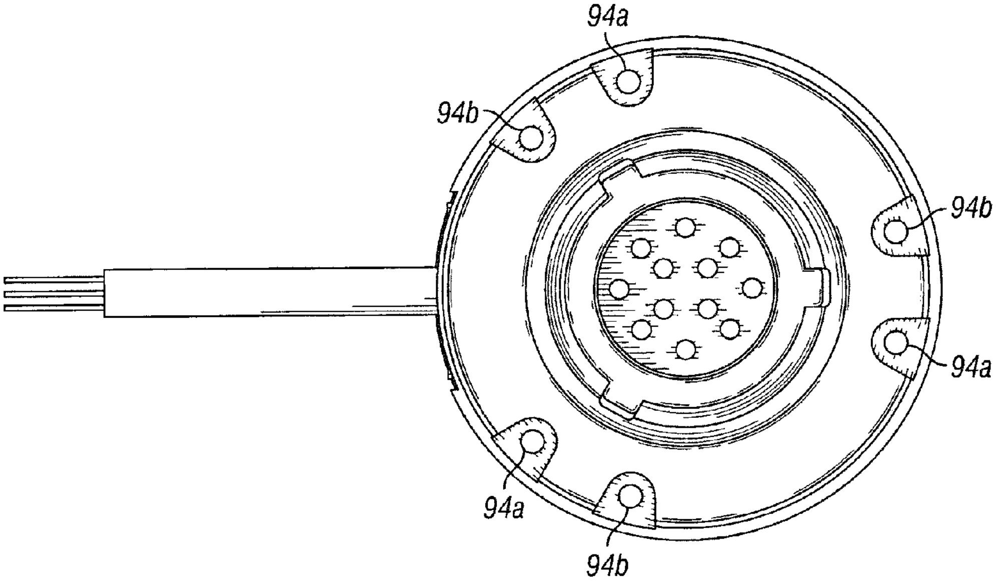
FIG. 10 illustrates a schematic plan view of a low lumen package light engine, according to yet another specific example embodiment of this disclosure.

Referring to FIG. 10, depicted is a schematic plan view of a low lumen package light engine module, according to yet another specific example embodiment of this disclosure. A low lumen package LED module 120 is shown having three (3) position holes **94*a* and three (3) key holes 94*b* located at specific positions in the LED module 120 and 120*a*. The position hole(s) 94***a* and key hole(s) 94*b* are arranged as a specific number of holes having specific positional relationships. In addition, the inside diameters of the position holes 94*a* and the key holes 94*b* may also be different so as to better distinguish the LED module 120 rating. The key/position holes 94 fit over corresponding key/position pins 95 located on the face of the back heat sink 105. A purpose of proper mating of the key/position holes 94 and corresponding key/position pins 95 is to prevent attachment of a LED module 120 to a back heat sink 105 having inadequate capabilities need to dissipate heat from the LED module 120.

Figure 11:
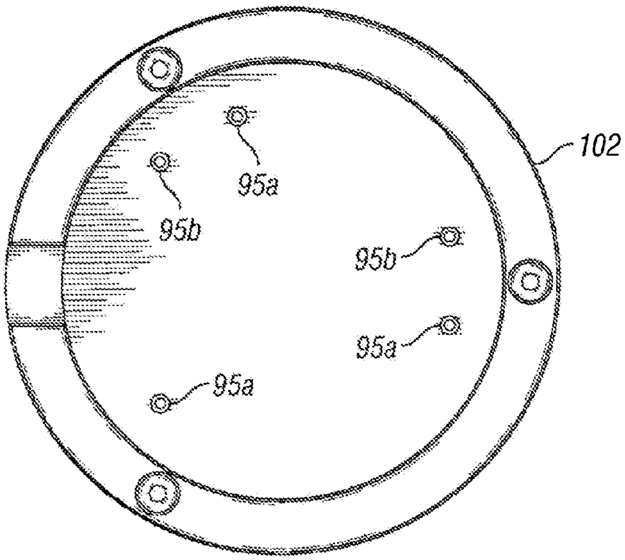
FIG. 11 illustrates a schematic plan view of a socket for the medium lumen package light engine shown in FIG. 9.

Referring to FIG. 11, depicted is a schematic plan view of a socket for the medium lumen package light engine shown in FIG. 9. The socket comprises the mounting ring 102 attached to the face of the back heat sink 105, wherein the key pins 95*b* on the face of the back heat sink 105 fit into corresponding key holes 94*b* in the LED module 120, and, similarly, the position pins 95*a* fit into corresponding position holes 94*a* of a LED module 120. The key pins 95*b* can provide for downward compatibility using a higher power dissipation back heat sink 105 with a lower power (heat generating) LED module 120, e.g., there are more key pins 95*b* on the face of a lower power back heat sink 105 than on the face of a higher power dissipation back heat sink 105. Therefore, from the specific example embodiments of the three different heat dissipation rated LED modules 120 shown in FIG. 8-10, it can readily be seen that the low or medium lumen light engine LED module 120 will fit into an assembly comprising the mounting ring 102 and high power dissipation back heat sink 105 configured for high lumen modules. Likewise, an assembly comprising the mounting ring 102 and medium power dissipation back heat sink 105 configured for medium lumen modules will readily accept a low lumen LED module 120.

It is contemplated and within the scope of this disclosure that any arrangements of key/position holes 94 and/or corresponding key/position pins 95 may be used to differentiate LED modules 120 having different power dissipation requirements and to ensure that an appropriate back heat sink 105 is used therewith. The key/position holes 94 and corresponding key/position pins 95 may also be arranged so that a higher heat dissipation back heat sink 105 can be used with lower power dissipation LED modules 120, and prevent a lower heat dissipation back heat sink 105 from being used with LED modules 120 having heat dissipation requirements greater than what the lower heat dissipation back heat sink 105 can adequately handle.

Figure 12:
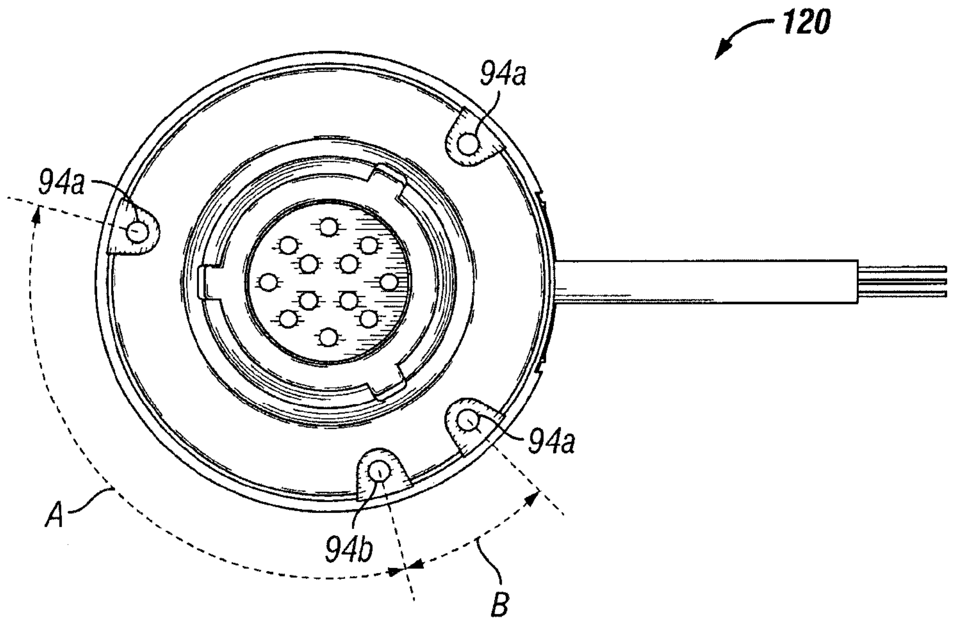
FIG. 12 illustrates a plan view of the light engine of FIGS. 1-3 showing positional relationships of the position and key holes, according to the specific example embodiments of this disclosure.

Referring to FIG. 12, depicted is a schematic plan view of the light engine module of FIGS. 1-3 showing positional relationships of the position and key holes, according to the specific example embodiments of this disclosure. The position holes 94*a* of the LED module 120 may be equidistantly spaced apart around, e.g., A=120 degrees, but is not limited to that spacing and may be any spacing appropriate for positional implementation of the LED module 120 to the mounting ring 102 and/or back heat sink 105. The at least one key hole 94*b* is placed between the position holes 94*a* at B degrees from the nearest one of the position holes 94*a*.

Figure 13:
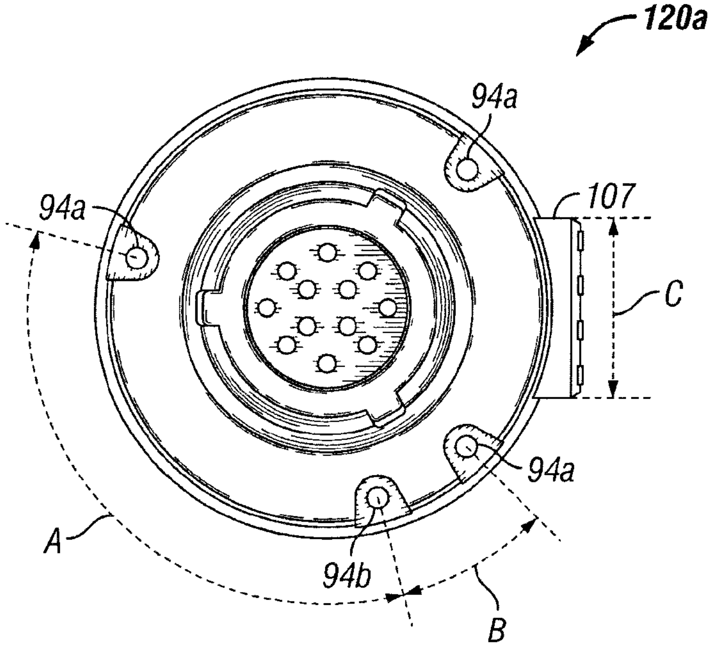
FIG. 13 illustrates a plan view of the light engine of FIGS. 4-6 showing positional relationships of the position and key holes, and electrical connector, according to the specific example embodiments of this disclosure.

Referring to FIG. 13, depicted is a schematic and plan view of the light engine module of FIGS. 4-6 showing positional relationships of the position and key holes, and electrical connector, according to the specific example embodiments of this disclosure. The position holes 94*a* of the LED module 120*a* may be equidistantly spaced apart around, e.g., A=120 degrees, but is not limited to that spacing and may be any spacing appropriate for positional implementation of the LED module 120*a* to the mounting ring 102*a* and/or back heat sink 105. The at least one key hole 94*b* is placed between the position holes 94*a* at B degrees from the nearest one of the position holes 94*a*. The connector 107 may be located between two of the position holes 94*a* and have a width of C.

It is contemplated and within the scope of this disclosure that the position/key holes 94 can be a first position/key means having any shape, e.g., round, square, rectangular, oval, etc., can be a notch, a slot, an indentation, a socket, and the like. It is also contemplated and within the scope of this disclosure that the position/key pins 95 can be a second position/key means having any shape, e.g., round, square, rectangular, oval, etc., can be a protrusion, a bump, an extension, a plug, and the like. It is also contemplated and within the scope of this disclosure that the first and second position/key means can be interchangeable related on the face of the back heat sink 105 and the back of the LED module 120.

Figure 14:
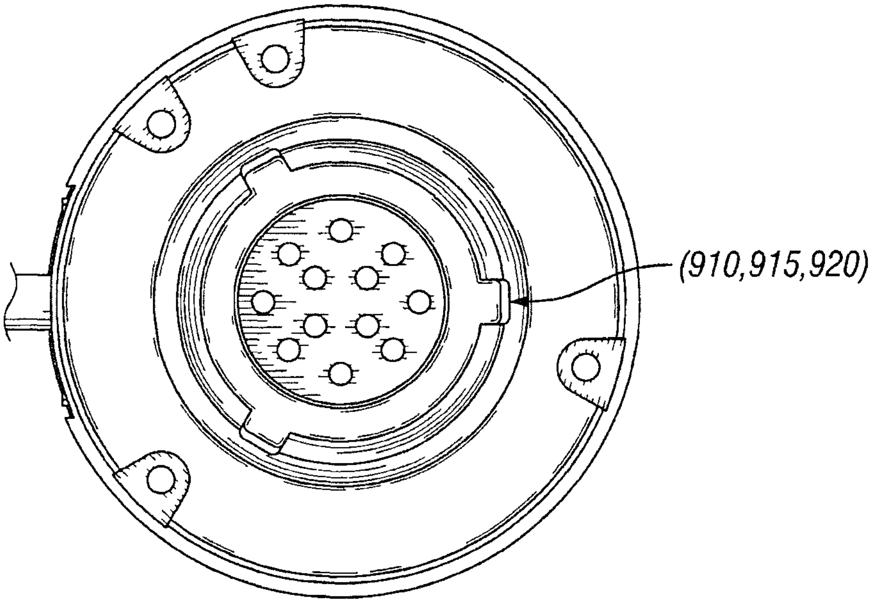
FIG. 14 illustrates a schematic plan view of the light engines shown in FIGS. 1-13 having optical system attachment features, according to specific example embodiments of this disclosure.

Referring to FIG. 14, depicted is a schematic plan view of the light engine modules shown in FIGS. 1-13 having optical system attachment features, according to specific example embodiments of this disclosure. Shown are three bottom notches (see notches 910, 915 and 920 shown in FIGS. 24-27) for mechanically interfacing with a light reflector 115 (described more fully hereinafter) having tabs 905 (see FIGS. 24).

Figure 15:
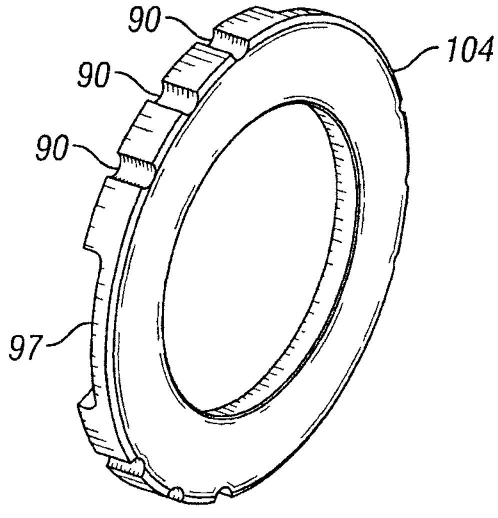
FIG. 15 illustrates a schematic perspective view of the locking ring shown in FIGS. 1 and 4.

Referring to FIG. 15, depicted is a schematic perspective view of the locking ring 104 shown in FIGS. 1 and 4. The opening 97 in the locking ring 104 allows exit of the electrical wiring 106 from the LED module 120 and 120*a*. Optionally, serrations 90 along the circumference of the locking ring 104 can be used to improve gripping during installation of the LED module and locking ring 104.

Figure 16:
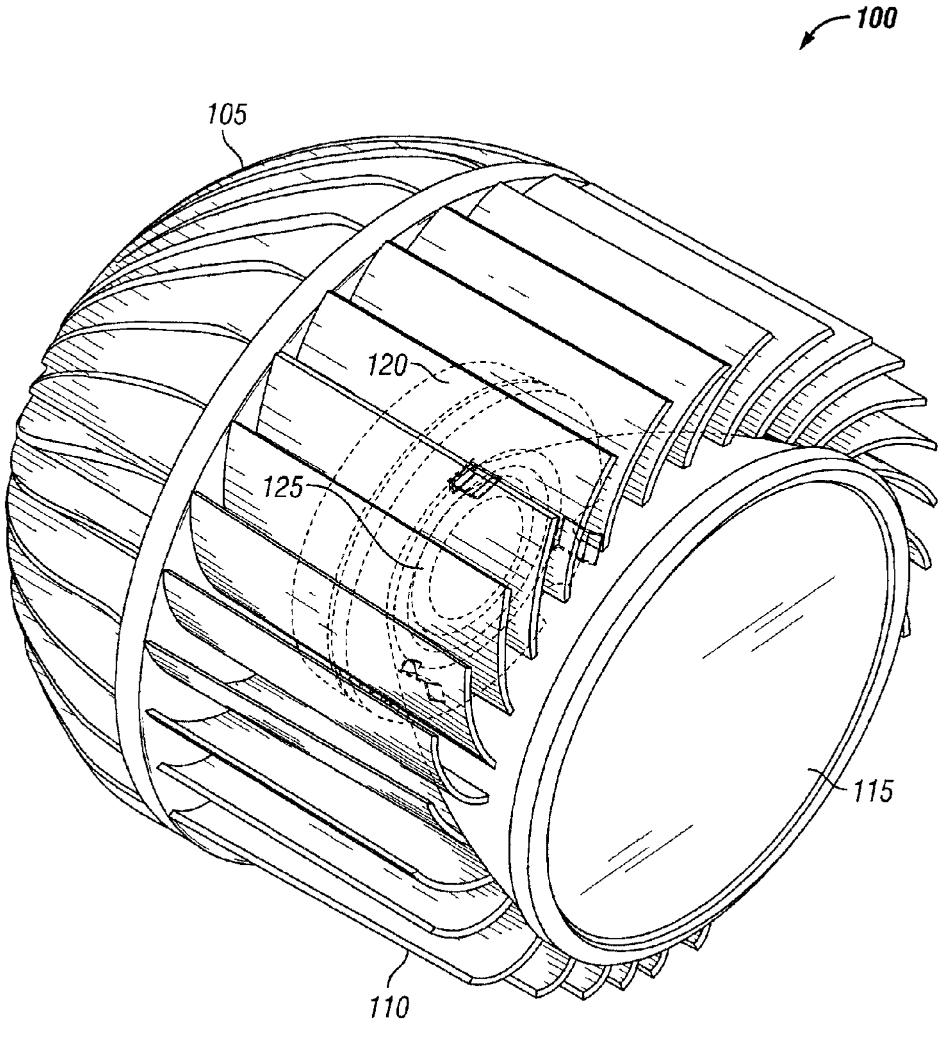
FIG. 16 illustrates a generic perspective view of the LED devices of FIGS. 1-15 shown fully assembled, according to specific example embodiments of this disclosure.

Referring to FIG. 16, depicted is a generic perspective view of the LED devices of FIGS. 1-15 shown fully assembled, according to specific example embodiments of this disclosure. An LED device, generally represented by the numeral 100, includes a back heat sink 105, a front heat sink 110, a reflector 115, an LED module 120, and a spring 125. The back heat sink 105 is coupled to the front heat sink 110, e.g., using known coupling methods. The back heat sink 105 and the front heat sink 110 are constructed from heat conductive materials known to those having ordinary skill in the art of heat conduction, e.g., metals such as aluminum, copper, copper-alloy; heat pipes in the heat sink, beryllium oxide, etc., the metals preferably being black anodized and the like. While both the back heat sink 105 and the front heat sink 110 are presented in the exemplary embodiments as having a circular cross section, other shapes are contemplated herein, including, but not limited to, square, rectangular, triangular, or other geometric and non-geometric shapes are within the capability, scope and spirit of this disclosure.

In one exemplary embodiment, both the back heat sink 105 and the front heat sink 110 include a plurality of fins with air gaps therebetween to promote convective cooling. Optionally, holes or openings between the heat sink fins may further encourage convective airflow through the air gaps and over the plurality of fins. The LED module 120 is releasably coupled to the back heat sink 105 as will be discussed in more detail with reference to FIG. 21 below. In one exemplary embodiment, the LED module 120 is an at least two-piece module with one or more LEDs and power components surrounded along the bottom and sides by an enclosure. In one exemplary embodiment, the enclosure is constructed from aluminum. In the exemplary embodiment shown in FIGS. 16-25, the LED module 120 has a circular cross section. However, the circular shape is exemplary only and is not intended to be limiting. The LED module 120 is capable of being constructed in different geometric and non-geometric shapes, including, but not limited to, square, rectangular, triangular, etc.

The reflector 115 is releasably and rotatably coupled to the LED module 120 as will be described in more detail with reference to FIGS. 23-27 hereinbelow. The reflector 115 can be constructed from metal, molded glass or plastic material and preferably may be constructed from spun aluminum. The reflector 115 helps to direct the light emitted from the LEDs in the LED module 120. In one exemplary embodiment, the reflector 115 is a conical or parabolic reflector. In this exemplary embodiment, the outer diameter of the reflector 115 is less than or substantially equal to the inner diameter of the fins of the front heat sink 110. Preferably, the outer diameter of the reflector 115 is substantially equal to the inner diameter of the fins of the front heat sink 110 to promote the conduction of heat from the reflector 115 to the fins.

The spring 125 is releasably coupled to the LED module 120. The exemplary spring 125 shown is a flat or leaf spring, however other types of springs, including, but not limited to coiled springs can be used and are within the scope of the invention. The spring 125 provides a biasing force against the reflector 115 in the direction of the larger opening of the reflector 115.

Figure 17:
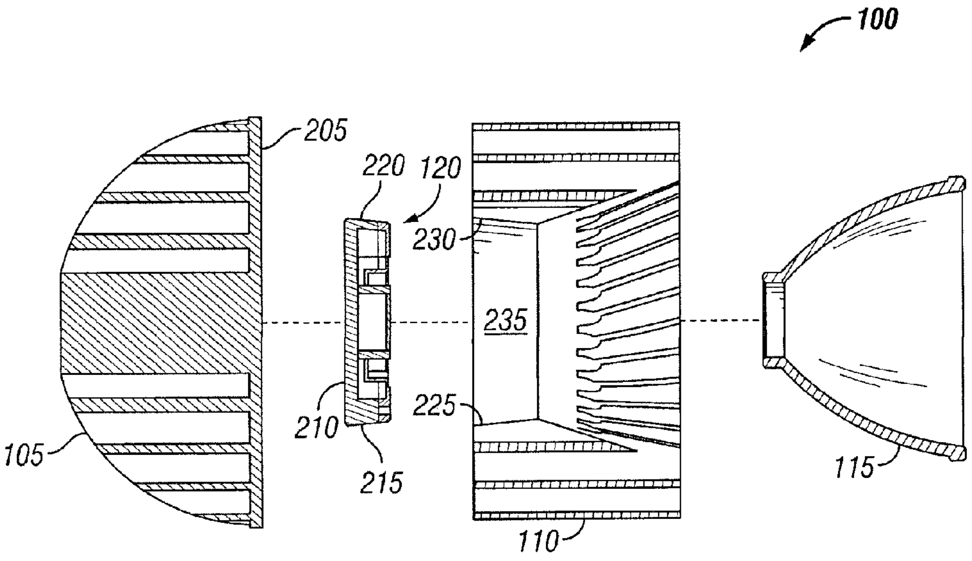
FIG. 17 illustrates an exploded elevational view of the LED device shown in FIG. 16, according to a specific example embodiment of this disclosure.

Referring to FIG. 17, depicted is an exploded elevational view of the LED device shown in FIG. 16, according to a specific example embodiment of this disclosure. The exploded view of the LED device 100 shows a back heat sink 105 which includes a flat or substantially flat side or interface 205 for receiving a flat or substantially flat back side or interface 210 of the LED module 120. The interfaces 205 and 210 are adapted to mate in close thermal communication so as to promote efficient conduction of heat away from the back side 210 of the LED module 120 and to the back heat sink 105, wherein this heat is subsequently dissipated through the back heat sink 105. The LED module 120 has sides 215 and 220 that are tapered from the front of the LED module (side having the LEDs and light projected therefrom) to the back of the LED module 120 (side in physical and thermal contact with the back heat sink 105), such that the diameter of the back of the LED module 120 is greater than the diameter of the front of the LED module 120. The taper of the sides 215 and 220 has a range of between about one and eighty-nine degrees from vertical and is preferably between about five and thirty degrees. The front heat sink 110 includes a cavity 235 positioned along the back center of the front heat sink 110. The cavity 235 is bounded by sides 225 and 230 inside of the front heat sink 110. In one exemplary embodiment, the sides 225 and 230 are tapered, wherein the inner diameter of the cavity 235 at the back of the heat sink 110 is greater than the inner diameter of the cavity 235 toward the front of the heat sink 110. In one exemplary embodiment, the dimensions of the cavity 235 are equal to or substantially equal to the dimensions of the LED module 120, and the dimensions and angle of taper for the sides 225 and 230 of the front heat sink 110 equals or is substantially equal to the dimensions and angle of taper for the sides 215 and 220 of the LED module 120. In the embodiment shown in FIG. 17, the LED module 120 is releasably coupled to the back heat sink 105. Then the front heat sink 110 is slidably positioned over the LED module 120 and coupled to the back heat sink 105, thereby securely holding the LED module 120 in a substantially centered position between the front heat sink 110 and the back heat sink 105. The substantial similarity in the inner dimensions of the cavity 235 and the outer dimensions of the LED module 120 ensure proper positioning of the front heat sink 110 and improved conduction of heat from the sides and front of the LED module 120 to the front heat sink 110.

Figure 18:
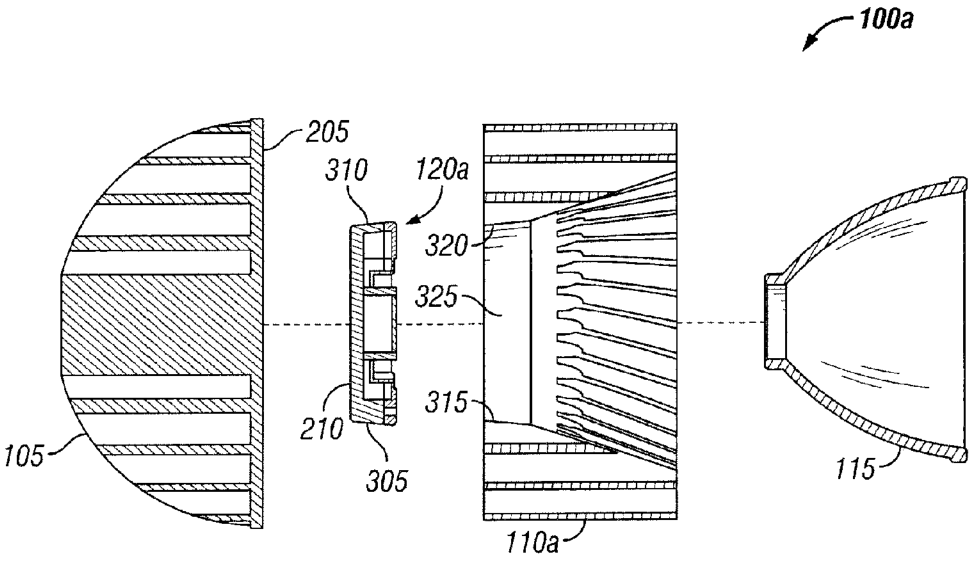
FIG. 18 illustrates an exploded elevational view of the LED device shown in FIG. 16, according to another specific example embodiment of this disclosure.

Referring to FIG. 18, depicted is an exploded elevational view of the LED device shown in FIG. 16, according to another specific example embodiment of this disclosure. The exploded view of the LED device 100*a* shows the back heat sink 105 which includes a flat or substantially flat side or interface 205 for receiving a flat or substantially flat back side or interface 210 of the LED module 120*a*. The interfaces 205 and 210 are adapted to mate in close thermal communication so as to promote efficient conduction of heat away from the back side 210 of the LED module 120 and to the back heat sink 105, wherein this heat is subsequently dissipated through the heat sink 105. The LED module 120*a* has sides 305 and 310 that are tapered from the front of the LED module (side having the LEDs and light projected therefrom) to the back of the LED module 120 (side in physical and thermal contact with the back heat sink 105), such that the diameter of the front of the LED module 120*a* is greater than the diameter of the back of the LED module 120*a*. The taper of the sides 305 and 310 has a range of between one and eighty-nine degrees and is preferably between five and thirty degrees. The front heat sink 110*a* includes a cavity 325 positioned along the back center of the front heat sink 110*a*. The cavity 325 is bounded by sides 315 and 320 inside of the front heat sink 110*a*. In one exemplary embodiment, the sides 315 and 320 are tapered, wherein the inner diameter of the cavity 325 at the back of the heat sink 110 is less than at the inner diameter of the cavity 325 toward the front of the heat sink 110*a*. In one exemplary embodiment, the dimensions of the cavity 325 are equal to or substantially equal to the dimensions of the LED module 120*a* and the dimensions and angle of taper for the sides 315 and 320 of the front heat sink 110*a* equals or is substantially equal to the dimensions and angle of taper for the sides 305 and 310 of the LED module 120*a*. In the embodiment shown in FIG. 18, the front heat sink 110*a* is releasably coupled to the back heat sink 105. Then, the LED module 120*a* is slidably inserted through the front of the front heat sink 110*a* and into the cavity 325. The LED module 120*a* is then releasably coupled to the back heat sink 105. The similarity in dimensions of the cavity 235 and the LED module 120*a* ensure proper positioning of the LED module 120*a* and the front heat sink 110*a* and improves conduction of heat from the sides and front of the LED module 120*a* to the front heat sink 110*a*.

Figure 19:
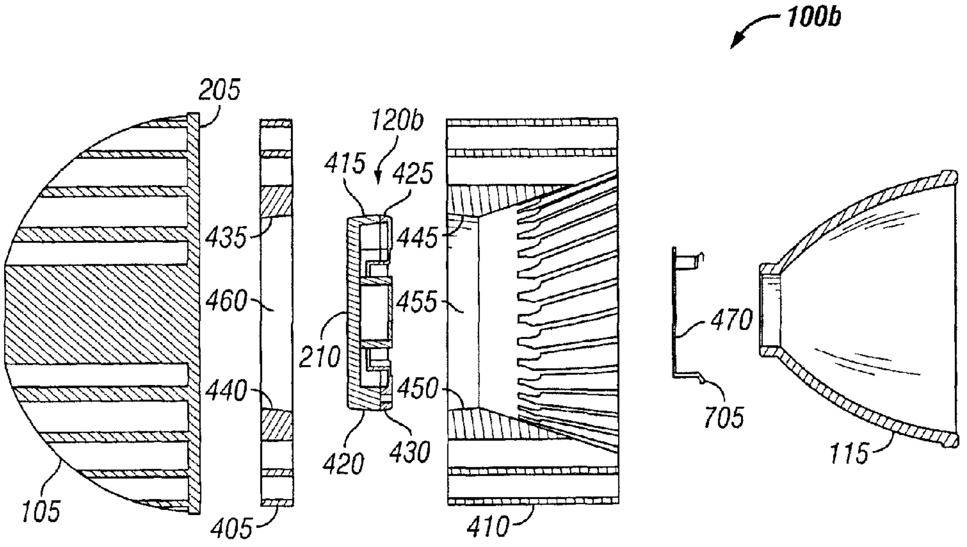
FIG. 19 illustrates an exploded elevational view of the LED device shown in FIG. 16, according to yet another specific example embodiment of this disclosure.

Referring to FIG. 19, depicted is an exploded elevational view of the LED device shown in FIG. 16, according to yet another specific example embodiment of this disclosure. The exploded view 100*b* shows the back heat sink 105 which includes a flat or substantially flat side or interface 205 for receiving a flat or substantially back side or interface 210 of the LED module 120*b*. The interfaces 205 and 210 are adapted to mate in close thermal communication so as to promote efficient conduction of heat away from the back side 210 of the LED module 120*b* and to the back heat sink 105, wherein this heat is subsequently dissipated through the heat sink 105. The sides of the LED module 120*b* have two different tapers. The first side taper 415 and 420 begins at or substantially near the back of the LED module 120*b* and is tapered from back to front of the LED module 120*b*, such that the diameter of the back of the LED module 120*b* is less than the diameter as you move towards the front of the LED module 120*b*. The second side taper 425 and 430 begins at or substantially near the front side of the LED module 120*b* and is tapered from the front toward the back of the LED module 120*b*, such that the diameter at the front of the LED module 120*b* is less than the diameter as you move towards the back of the LED module 120*b*. The tapers can converge at any point along the side of the LED module 120*b*. Each of the tapers 415, 420, 425 and 430 has a range of between one and eighty-nine degrees from vertical and is preferably between five and thirty degrees.

The LED device 100*b* further comprises an interposing heat sink 405 located between the back heat sink 105 and a front heat sink 410. The interposing heat sink 405 has a cavity 460 that is substantially similar in shape to the back portion of the front heat sink 110*a* shown in FIG. 18. The interposing heat sink 405 has an outer size and dimension substantially matching that of the front heat sink 410 and similarly includes fins extending outward to promote heat transfer from the LED module 120*a*. The interposing heat sink 405 includes the cavity 460 positioned along the center of the interposing heat sink 405 to create a passage therethrough. The cavity 460 is bounded on the side by sides 435 and 440 of the interposing heat sink 405. In one exemplary embodiment, the sides 435 and 440 are tapered from front to back such that the inner diameter of the cavity 460 at the front is greater than at the back. In one exemplary embodiment, the dimensions of the cavity 460 are equal to or substantially equal to the dimensions of the LED module 120*b* up to the end of the first taper 415 and 420 and the dimensions and angle of taper for the sides 435 and 440 of the interposing heat sink 405 equals or is substantially equal to the dimensions and angle of the first taper 415 and 420 for the side of the LED module 120*b*. In the embodiment shown in FIG. 19, the interposing heat sink 405 is releasably coupled to the back heat sink 105. Then, the LED module 120*b* is slidably inserted through the front of the interposing heat sink 405 and into the cavity 460. The LED module 120*b* is then releasably coupled to the back heat sink 105. The similarity in dimensions of the cavity 460 and the LED module 120*b* ensure proper positioning of the LED module 120*b* and the interposing heat sink 405.

The front heat sink 410 includes a cavity 455 positioned along the back center of the front heat sink 410. The cavity 455 is bounded by sides 445 and 450 of the front heat sink 410. In one exemplary embodiment, the sides 445 and 450 are tapered from back to front such that the inner diameter of the cavity 455 at the back is greater than at the front of the front heat sink 410. In one exemplary embodiment, the dimensions of the cavity 455 are equal to or substantially equal to the dimensions of the LED module 120*b* from the second taper 425, 430 up to the front of the LED module 120*b* and the dimensions and angle of taper for the sides 445, 450 of the front heat sink 410 equals or is substantially equal to the dimensions and angle of the second taper 425, 430 for the sides of the LED module 120*b*. In the embodiment of FIG. 4, the front heat sink 410 is slidably positioned over the LED module 120*b* and is coupled to the interposing heat sink 405 and/or the back heat sink 105. The similarity in dimensions of the cavity 455 and the top portion of the LED module 120*b* ensure proper positioning of the front heat sink 410 and improved conduction of heat from the sides and front of the LED module 120*b* to the interposing heat sink 405 and the front heat sink 410. A spring assembly 470 is used as an aid in securing the reflector 115 to the front heat sink 410, as more fully described hereinafter.

Figure 20:
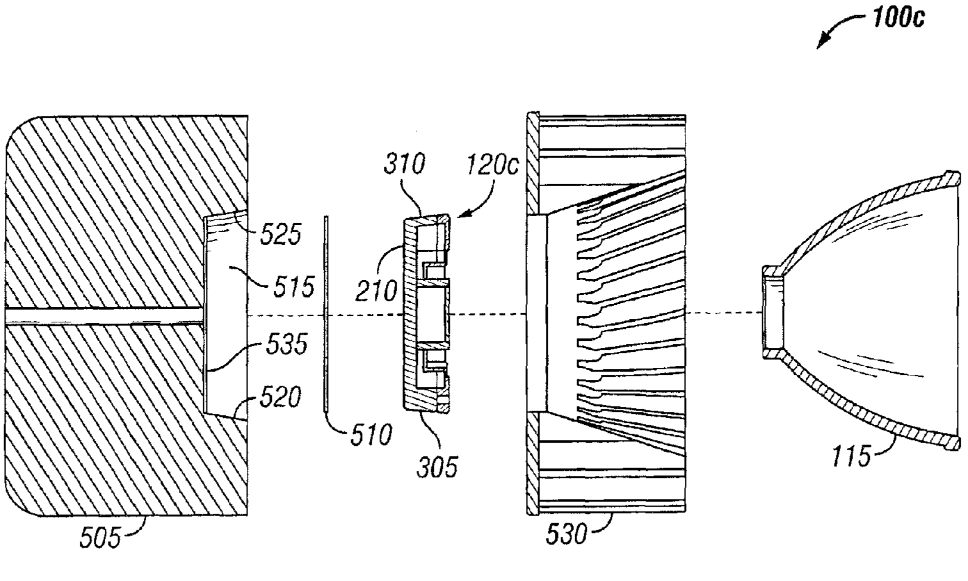
FIG. 20 illustrates an exploded elevational view of the LED device shown in FIG. 16, according to still another specific example embodiment of this disclosure.

Referring to FIG. 20, depicted is an exploded elevational view of the LED device shown in FIG. 16, according to still another specific example embodiment of this disclosure. The exploded view of the back heat sink 505 is substantially similar to the back heat sink 105 of FIGS. 16-19 except as more fully disclosed hereinafter. The back heat sink 505 includes a flat or substantially flat side or interface 535 within a cavity 515 for receiving a flat or substantially flat back side or interface 210 of the LED module 120*c*. The flat interfaces 535 and 210 are in substantial thermal communication so as to promote efficient conduction of heat away from the back side 210 of the LED module 120*c* to the back heat sink 505. The side 305, 310 of the LED module 120*c* is tapered from top to bottom, such that the diameter of the top of the LED module 120*c* is greater than the diameter of the bottom of the LED module 120*c*. The taper of the side has a range of between one and eighty-nine degrees from vertical and is preferably between five and thirty degrees.

The back heat sink 505 includes a cavity 515 positioned along the front center of the back heat sink 505. The cavity 515 is bounded on the side by sides 520 and 525 of the back heat sink 505. In one exemplary embodiment, the sides 520 and 525 are tapered from the front towards the back of the back heat sink 505 such that the inner diameter of the cavity 515 at the front is greater than toward the back thereof. In one exemplary embodiment, the dimensions of the cavity 515 are equal to or substantially equal to the dimensions of the LED module 120*c* and the dimensions and angle of taper for the sides 520 and 525 of the back heat sink 505 equals or is substantially equal to the dimensions and angle of taper for the sides 305 and 310 of the LED module 120*c*.

In the embodiment shown in FIG. 20, thermally conductive material 510 can optionally be inserted into the cavity 515 along the flat interface at the bottom of the cavity 515 (toward the back of the heat sink 505). In one exemplary embodiment, the thermally conductive material 510 is a thin flat thermally conductive material having a shape substantially similar to the shape of the back of the cavity 515. The thermally conductive material 510 acts as a cushion between the LED module 120*c* and the back heat sink 505 and maintains a consistent gap between the LED module 120*c* and the back heat sink 505. The thermally conductive material 510 also helps to transfer heat between the flat interface 210 of the LED module 120*c* and the back of the cavity 515. The LED module 120*c* is slidably inserted into the cavity 515, and, optionally, with the thermally conductive material 510 placed therebetween. The LED module 120*c* is releasably coupled to the back heat sink 505. Then, the front heat sink 530 is releasably coupled to the back heat sink 505. The similarity in dimensions of the cavity 515 and the LED module 120*c* ensures proper positioning of the LED module 120*c* into the back heat sink 505 and improves conduction of heat from the side and back of the LED module 120*c* to the back heat sink 505.

It is contemplated and within the scope of this disclosure that any of the specific example embodiments of the LED devices described herein may benefit from using the thermally conductive material 510 between the LED module and the back heat sink for increasing thermal conductivity therebetween.

Figure 21:
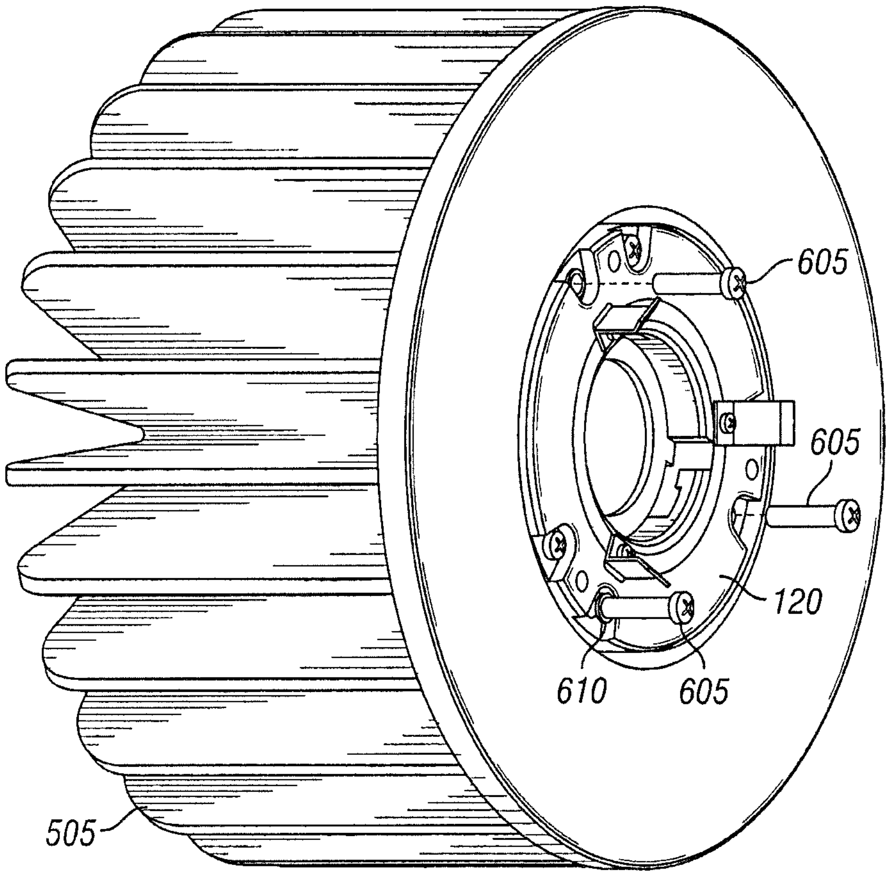
FIG. 21 illustrates a perspective view of a portion of the LED device shown in FIG. 20.
Figure 22A:
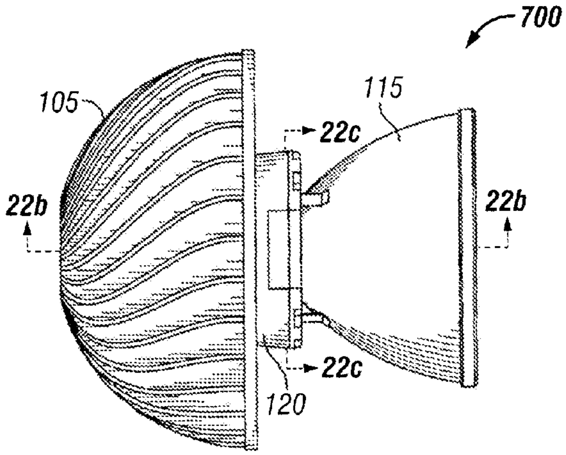
FIGS. 22A-22C illustrate an elevational, and cross-sectional views of a light reflector assembly for use in combination with the LED devices shown in FIGS. 1-21, according to the teachings of this disclosure.
Figure 22C:
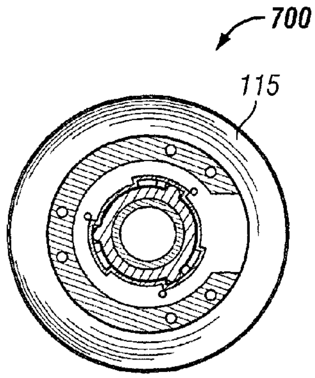
Figure 22B:
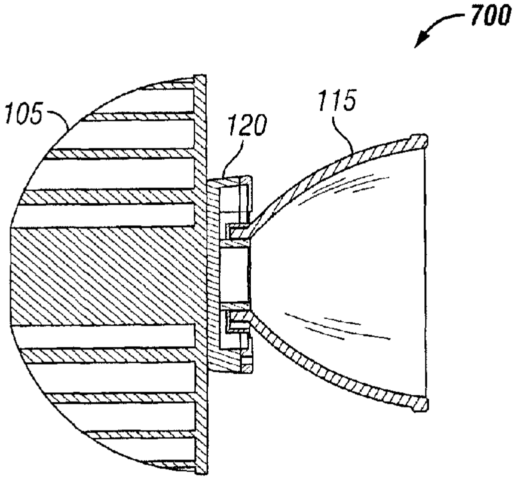
Figure 23:
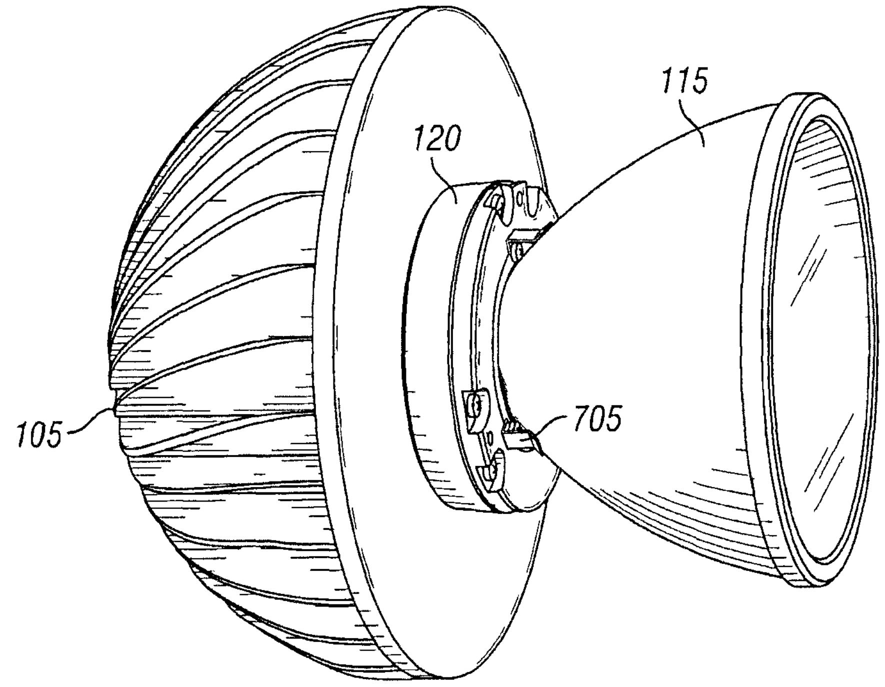
FIG. 23 illustrates a perspective view of the reflector assembly shown in FIGS. 22A-22C for use with any of the LED devices, according to the teachings of this disclosure.

Referring to FIG. 21, depicted is a perspective view of a portion of the LED device shown in FIG. 20. In situations involving significant heat transmission, the LED device further includes elastic or spring washers 610 to balance the expansion and contraction of materials making up the heat sinks 505 and 530, and to maintain adequate contact between the back heat sink 505 and the LED module 120*c*. The spring washers 610 are placed between fasteners 605 and the LED module 120*c*. In one exemplary embodiment, the fastener 605 is a screw, however, other fastening devices known to those of ordinary skill in the art can be used in place of each of the screws shown in FIG. 21. In the exemplary embodiment, three mounting points are shown, however, a number of mounting points greater or lesser than three can be used based on the size, use, and design criteria for the LED device 100*c*.

Further, while the concept of the elastic washer is shown and described in reference to the device 100*c* of FIG. 20, the use of elastic washers 610 can also be incorporated into the mounting of the LED module 120 in the devices shown in FIGS. 17-19.

Figure 24:
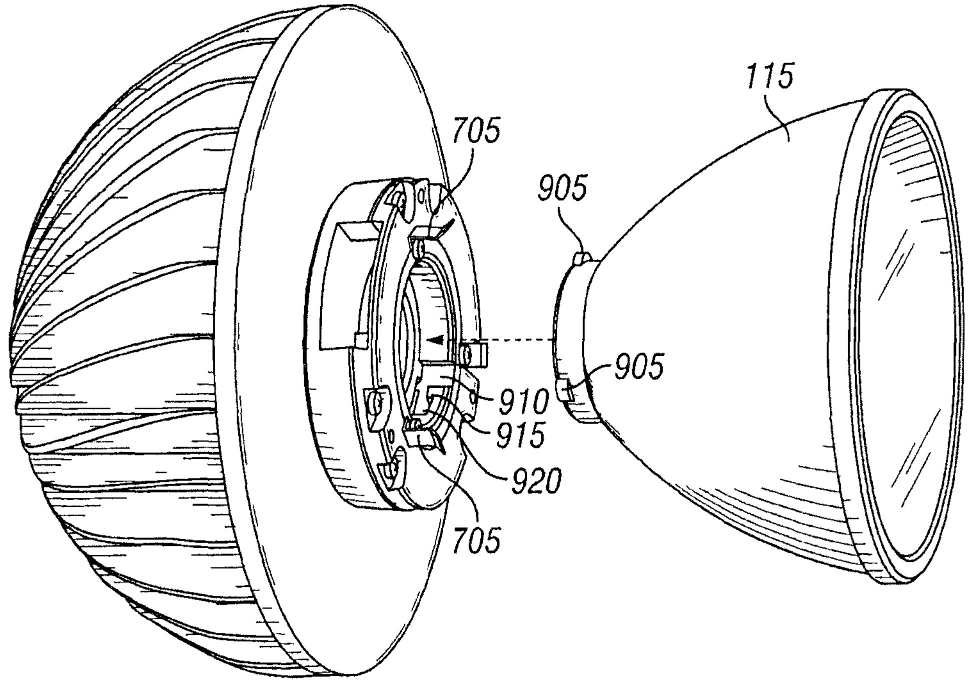
FIG. 24 illustrates a partially exploded view of the reflector assembly shown in FIGS. 22A-22C and 23.

Referring to FIGS. 22A-27, depicted are multiple views of the reflector attachment mechanism and assembly for use with the LED devices shown in FIGS. 16-21. Referring now to FIGS. 22A-27, the exemplary reflector attachment assembly includes the back heat sink 105, the reflector 115, the springs 705 and the LED module 120. As best seen in FIG. 24, the reflector 115 includes one or more tabs 905 extending out orthogonally or substantially orthogonally from the perimeter of the back (rear) end of the reflector 115. In one exemplary embodiment, the reflector 115 has three tabs 905, however, fewer or greater numbers of tabs 905 can be used based on design preferences and use of the LED device 100.

Each of the tabs 905 is positioned to match up with corresponding vertical notches 910 cut out from the inner diameter wall of the LED module 120. Each vertical notch 910 extends down into the LED module 120 a predetermined amount. A horizontal notch 915 in the LED module 120 intersects the vertical notch 910 and extends orthogonally or substantially orthogonally along the perimeter of the inner wall of the LED module 120. A second vertical notch 920 in the LED module 120 intersects the horizontal notch 915 along its second end and extends orthogonally or substantially orthogonally back up toward the front of the LED module 120 without extending to and through the front of the LED module 120 so that tabs 905 are locked therein.

Figure 25:
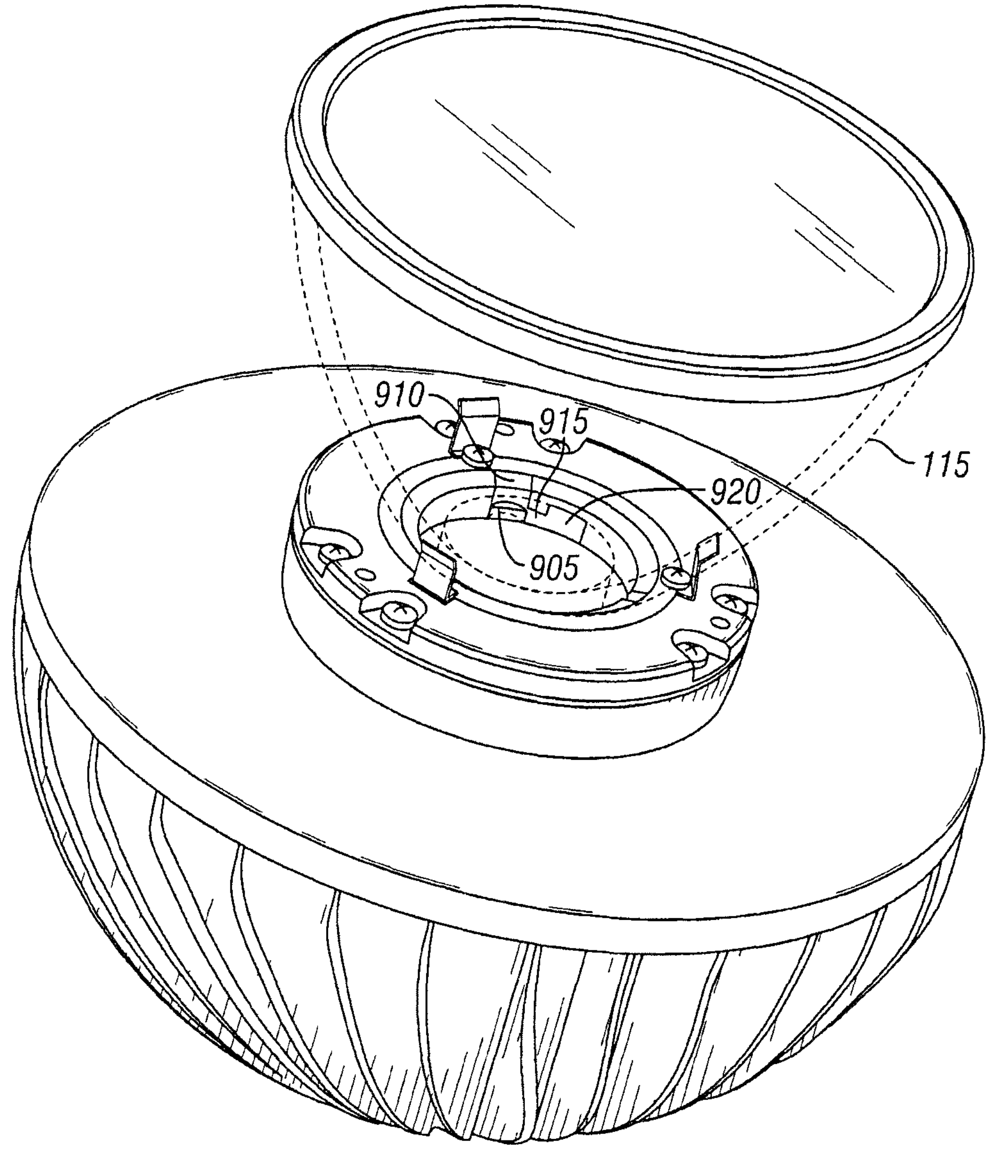
FIGS. 25-27 illustrate perspective views with partial transparency of the reflector assembly shown in FIGS. 22A-22C and 23.
Figure 26:
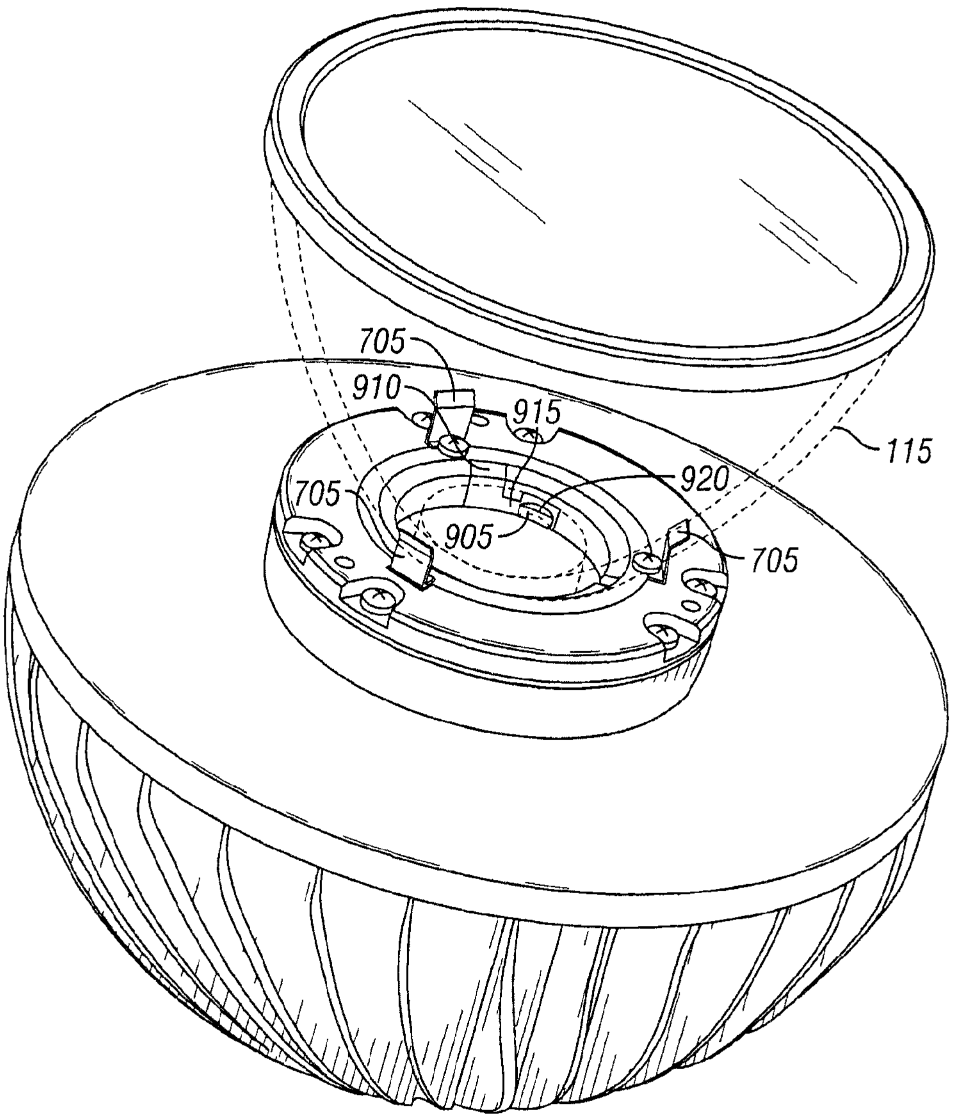
Figure 27:
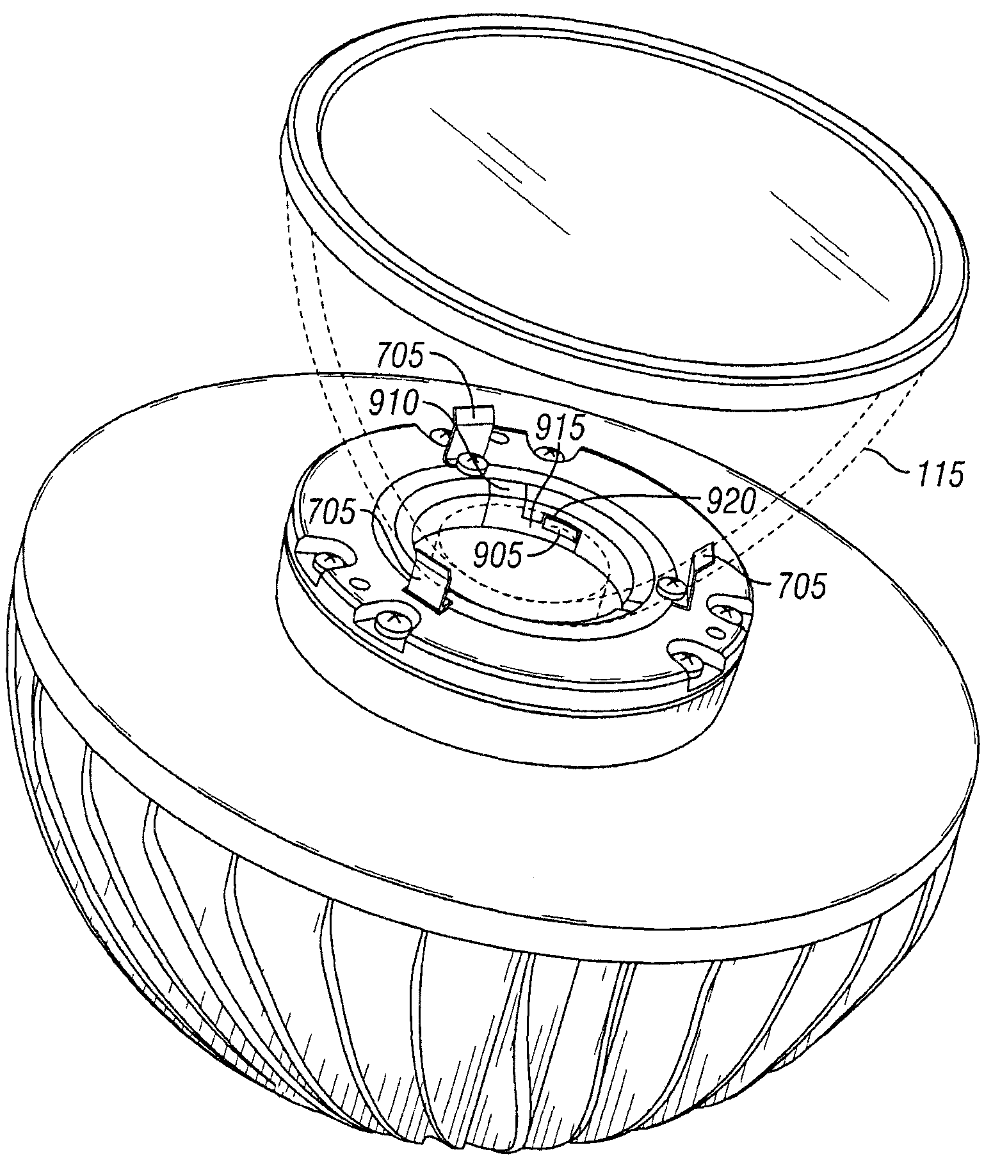

As shown in FIGS. 25-27, the tabs 905 are first aligned with the vertical notches 910 and then the tabs 905 are moved towards the back of the LED module 120 by providing a downward force on the reflector 115. Once each tab 905 reaches the bottom of the first vertical notch 910, the tab 905 is able to access the horizontal notch 915 by rotating the reflector 115. In the exemplary embodiment of FIG. 26, the reflector 115 is shown rotating in the clockwise direction, however, counterclockwise setups are within the scope and spirit of this invention. The reflector 115 is rotated clockwise and the tab 905 slides through the horizontal notch 915. Once the tab 905 reaches the end of the horizontal notch 915, the tab 905 is aligned with the second vertical notch 920. Biasing force from the springs 705 push the reflector 115 and the tabs 905 up so that the tabs 905 move up and into the second vertical notches 920, thereby locking the reflector 115 in place (FIG. 27). Since reflectors made from different materials typically have different manufacturing tolerances with which the tabs 905 can be made, these different tab sizes are compensated for by the use of the springs 705 to force the tabs 905 into the second notches 920. In order to remove the reflector 115 a user would have to apply a force downward on the reflector 115 towards the back heat sink 105 before turning the reflector counterclockwise, thereby moving the tabs 905 through the horizontal notches 920 until reaching the vertical notches 910 and removing the reflector 115 by moving the tabs 905 up through the vertical notches 910. The springs 705 help center the reflector 115 with the LED module 120.

It is contemplated and within the scope of this disclosure that the reflector 115 can attached to the locking ring 104 and both become an integral assembly (not shown) wherein when the reflector 115 is rotated the locking ring 104 engages the mounting ring 102, thereby holding the LED module 120 to the back heat sink 105.

It is contemplated and within the scope of this disclosure that the aforementioned LED devices 120 can be used for a wide range of lighting devices and applications, e.g., recessed cans, track lighting spots and floods, surface mounted fixtures, flush mounted fixtures for drop-in ceilings, cove lighting, under-counter lighting, indirect lighting, street lights, office building interior and exterior illumination, outdoor billboards, parking lot and garage illumination, etc.

Figure 28:
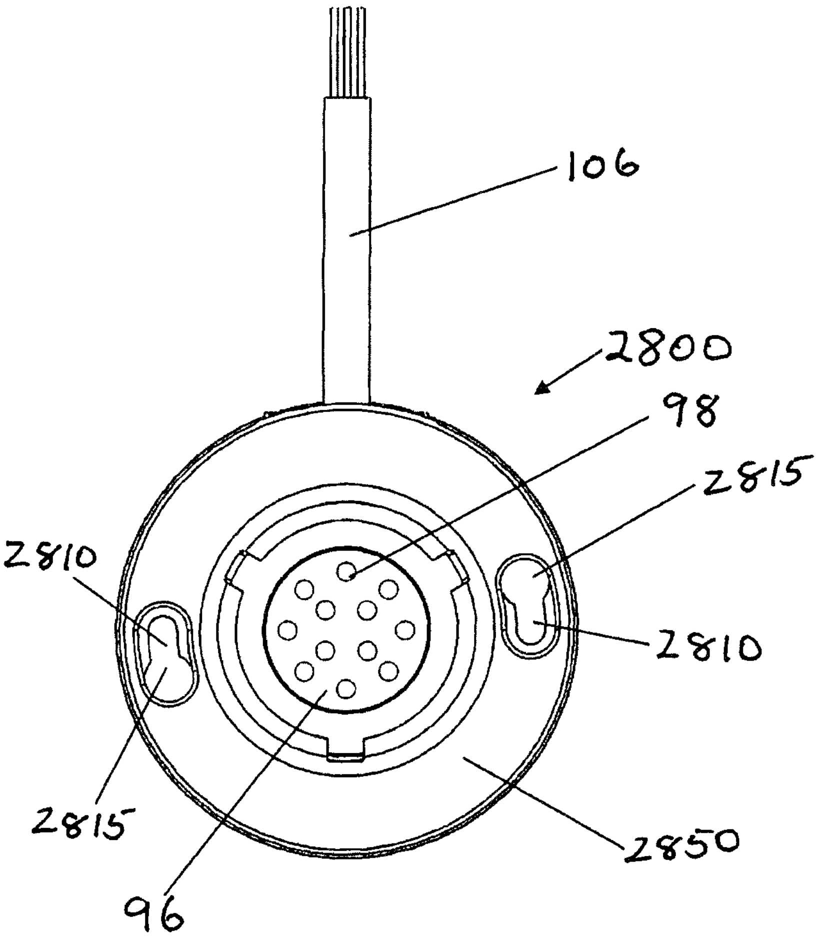
FIG. 28 illustrates a top plan view of another LED light engine module with a quick-release feature according to another exemplary embodiment of the disclosure.
Figure 29A:
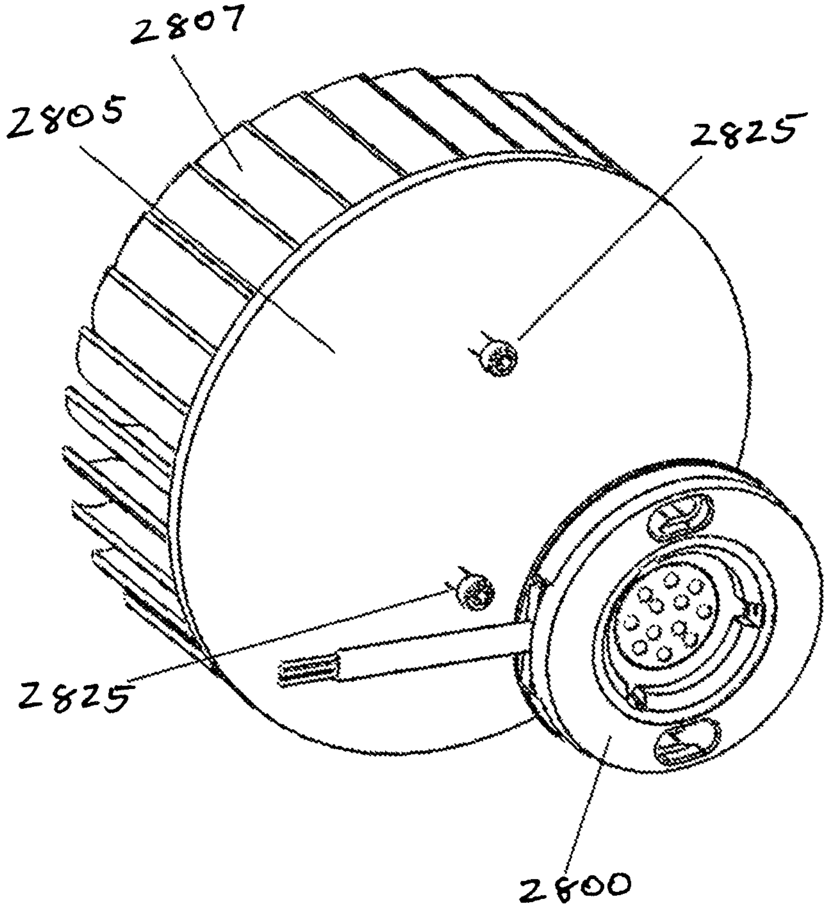
FIGS. 29A and 29B illustrate exploded and assembly views of another example of a modular LED device having a heat sink and the LED light engine module of FIG. 28 according to another exemplary embodiment of the disclosure.
Figure 29B:
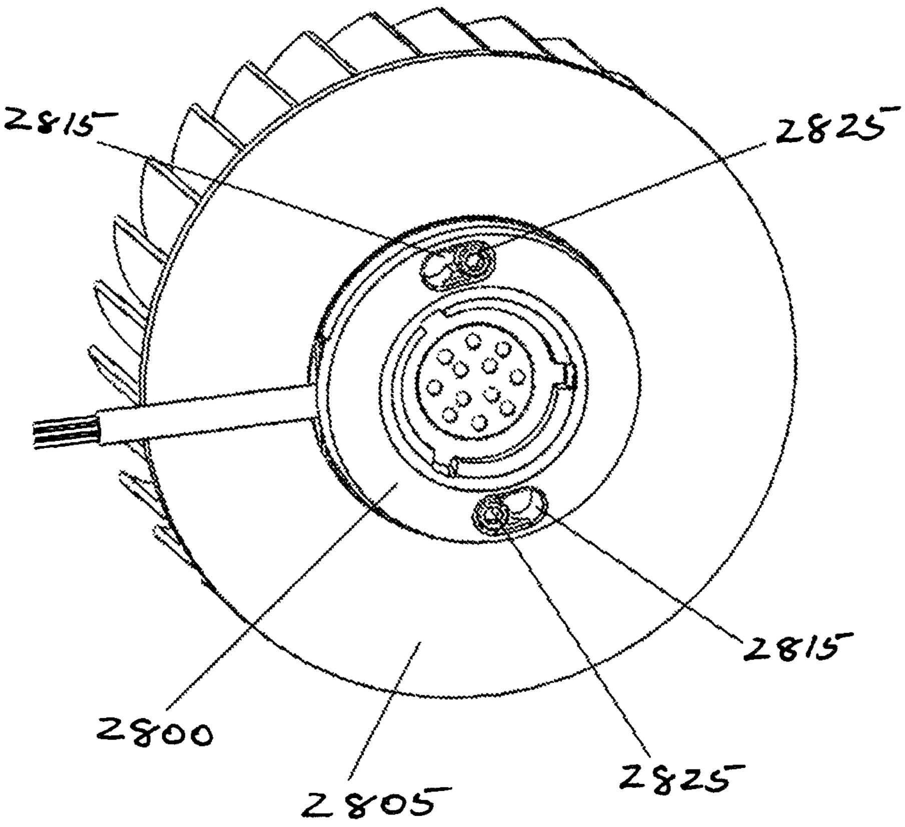

FIG. 28 illustrates a top plan view of another LED light engine module 2800 with a quick-release feature. FIGS. 29A and 29B illustrate differing views of another example of the modular LED device with the LED light engine module 2800 of FIG. 28. Referring now to FIGS. 28, 29A, and 29B, the exemplary modular LED device provides a method and apparatus for removably coupling a LED light engine module (hereinafter LED module) 2800 to a heat sink 2805 or reflector (not shown) by screws or other securing devices such as cam locks, bolts, wing-nuts or the like. The heat sink 2805 includes a quick release mechanism, for example two or more mounting screws 2825, that are disposed on a face of the heat sink 2805 that can be loosened or tightened to hold the LED module 100 in position. The exemplary heat sink also includes a plurality of fins 2807 with air gaps therebetween to promote convective cooling. Optionally, holes or openings between the heat sink fins 2807 may further encourage convective airflow through the air gaps and over the plurality of fins 2807. The exemplary heat sink 2805 also includes a flat or substantially flat front face or interface for receiving a flat or substantially flat back side or interface of the LED module 2800. The interfaces of the heat sink 2805 and the LED module 2800 are adapted to mate in close thermal communication so as to promote efficient conduction of heat away from the back side 210 of the LED module 2800 and to the heat sink 2805, wherein this heat is subsequently dissipated through fins 2807.

The exemplary LED module 2800 includes an outer housing 2850, a substrate 96 positioned within the outer housing and having one or more light emitting diodes (LEDs) or one or more LED packages 98. In one exemplary embodiment, the outer housing has a substantially circular shape. In certain exemplary embodiments, the outer housing 2850 is made of metal, plastic, or any other material known to those of ordinary skill in the art. The LED module 2800 includes one or more slots 2810 that extend through and provide a passageway through the outer housing 2850. In one exemplary embodiment, the LED module 2800 includes two slots 2810. In this exemplary embodiment, the slots 2810 are positioned on opposing sides of the outer housing 2850.

Each slot 2810 includes a corresponding keyhole 2815. In certain exemplary embodiments, the width of the slot 2810 is less than the diameter of the keyhole 2815 and the diameter of the keyhole is greater than the diameter of the head of the screw 2825 or other securing device. In addition, the width of the slot 2810 is typically greater than the diameter of the threaded portion of the screws 2825 but less than the head of the screw 2825 or other securing device. In operation, the LED module 2800 is held in place on the heat sink 2805 by the screws 2825. In certain exemplary embodiments, to remove the LED module 2800 from the heat sink 2805, the screws 2825, such as for example set screws, would be slightly loosened (but not removed) from the heat sink 2805 to allow movement of the LED module 2800 with respect to the screws 2825 such that the screws 2825 move along the slots 2810 until each screw 2825 reaches its respective keyhole 2815, or alternatively the exterior of the LED module (see alternative exemplary embodiments in FIGS. 30-35). Once the keyhole 2815 or exterior of the LED module has been reached by the screw 2825, the LED module can be removed, adjusted, repositioned or replaced.

As shown in FIG. 28, the exemplary slots 2810 are disposed through the outer housing 2850 in an arc-like or circular configuration, with the keyholes 2815 positioned at opposing ends of each slot 2810. In certain exemplary embodiments, the radius of curvature for each slot 2810 is the same and each slot 2810 is positioned at substantially the same radius along the outer housing 2850.

In one exemplary embodiment, to remove and replace the LED module 2800, the screws 2825 are loosened (but not completely removed) from the face of the heat sink 2805 and the LED module 2800 is rotated in a clockwise direction. Moving the LED module 2800 in a clockwise direction moves the screws 2825 through the corresponding slots 2810 until the screws 2825 are positioned in the keyhole 2815. At that point, the LED module 2800 is lifted upward and away from the screws 2825 and the face of the heat sink 2805. In certain exemplary embodiments, while the screws 2825 are in the slots 2810 but not in the respective keyholes 2815, the LED module 2800 in incapable of being removed from the screws 2825 due to the heads of the screws 2825 contacting the surface of the outer housing 2850 of the LED module 2800. Those of ordinary skill in the art will recognize that the number of slots 2810 could be greater or fewer than 2. For example, three or four slots could be provided and spaced equidistantly along the outer housing 2850. Further, the direction of the slots 2810 and keyholes 2815 could be reversed, so that removal of the LED module 2800 would be accomplished by rotating the module 2800 in the counter-clockwise direction and attachment would occur by lining up the keyholes 2815 with the screws 2825, positioning the heads of the screws 2825 through the keyholes 2815 and then rotating the LED module 2800 in the clockwise direction. Then the screws 2825 could be tightened while positioned along the slots 2810.

Figure 30:
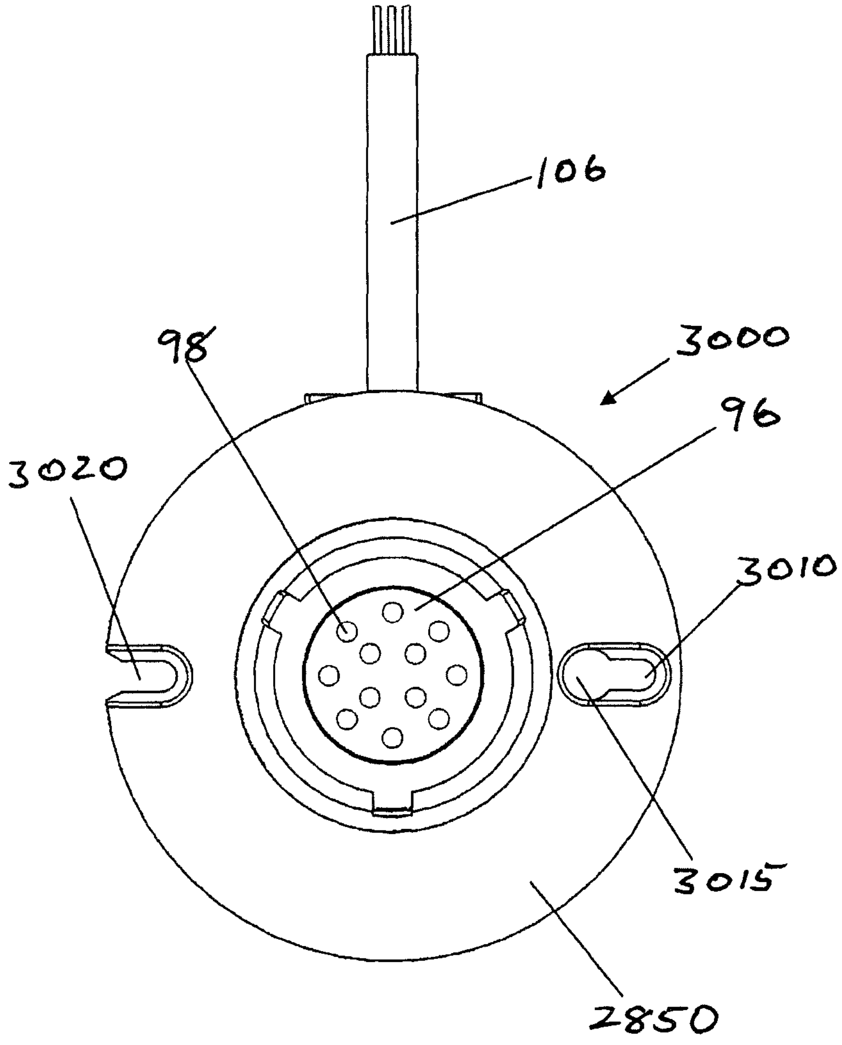
FIG. 30 illustrates a top plan view of another LED light engine module with another quick-release feature according to yet another exemplary embodiment of the disclosure.
Figure 31:
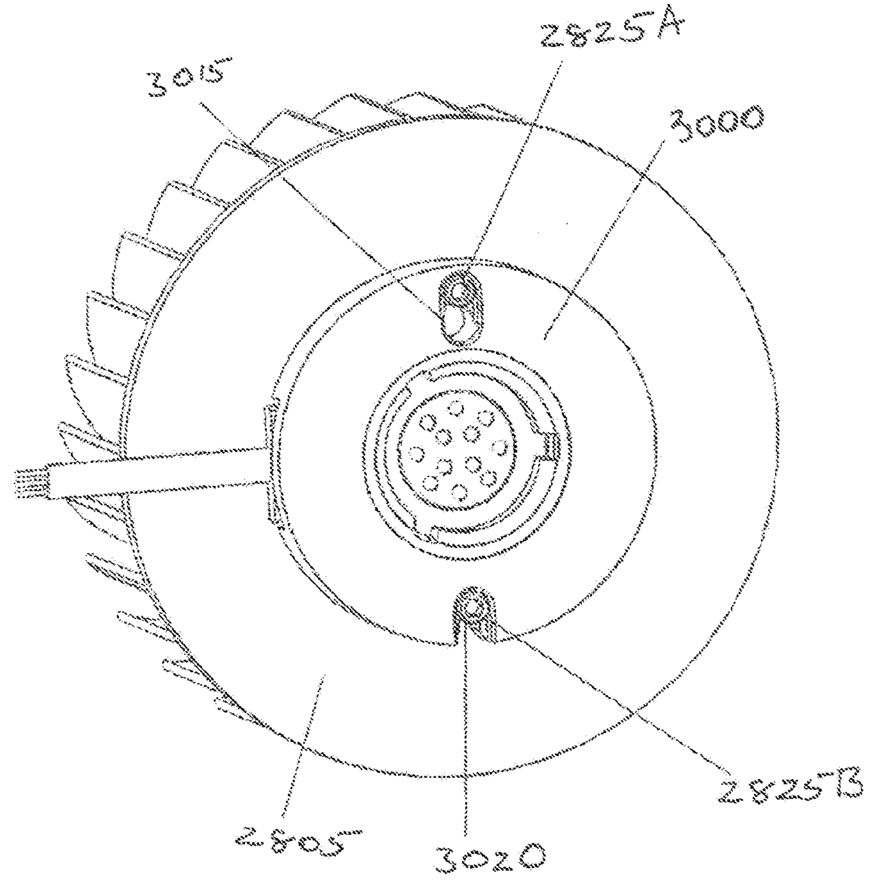
FIG. 31 illustrates an assembly view of a modular LED device with the LED light engine module of FIG. 30 according to another exemplary embodiment of the disclosure.

FIGS. 30 and 31 illustrate differing views of an alternative exemplary embodiment for a LED module 3000 with an alternative exemplary configuration for the slots 3010, 3020 and keyhole 3015 to provide an alternative quick-release feature from an exemplary heat sink 2805. Referring to FIGS. 30 and 31, the exemplary LED module 3000 includes a first slot 3010 and a second slot 3020. Each exemplary slot 3010, 3020 is disposed on the surface of the outer housing 2850 of the LED module 3000 and extends through the outer housing 2850 to provide a passageway therethrough. In certain exemplary embodiments, the first slot 3010 is straight or substantially straight and terminates with a keyhole 3015. The exemplary second slot 3020 is straight or substantially straight and terminates after passing through the outer perimeter of the outer housing 2850 of the LED module 3000. In one exemplary embodiment the dimensions of the slots 3010, 3020 and the keyhole 3015 with respect to the screws 2825 are the same as or substantially similar to that described above with reference to FIG. 28 and will not be repeated herein.

In one exemplary embodiment, the longitudinal axis of the slot 3010 is linearly aligned with the longitudinal axis of the slot 3020. In this alternative embodiment, with the slots 3010, 3020 and keyhole 3015 in linear relation to one-another, the LED module 3000 is capable of being replaced by loosening the screws 2825 and moving the LED module 3000 sideways to the left (or right if the slots 3010, 3020 are reversed) until the first screw 2825A reaches the keyhole 3015 and the second screw 2825B exits the side of the outer housing 2850 of the LED module 3000. While the exemplary embodiment of FIGS. 30 and 31 present the LED module 3000 and slots 3010, 3020 in a manner such that moving the LED module 3000 to the left allows for the removal thereof, it is contemplated in this disclosure that the orientation of slots 3010, 3020 and/or keyhole 3015 can be modified such that the LED module 3000 can be moved to the right, up, down or diagonally in order to position the screws 2825 within the keyhole 3015 or outside of the perimeter of the LED module 3000. In yet another alternative embodiment (not shown), the slot 3020 includes a keyhole instead of allowing the screw 2825B to exit the LED module 3000. Furthermore, while the exemplary embodiment of FIG. 30 presents the slots 3010, 3020 as being aligned along their longitudinal axes, in alternative embodiments, the slots are not aligned in this manner but merely maintain their respective longitudinal axes in parallel with one another.

Figure 32:
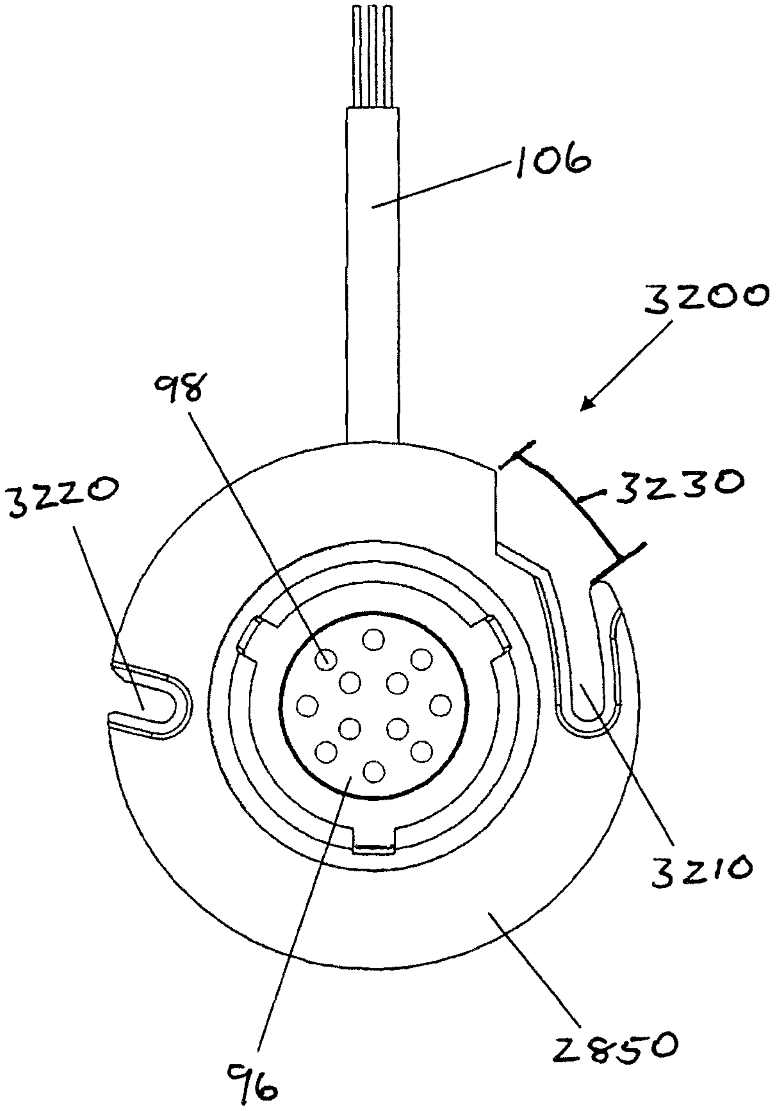
FIG. 32 illustrates a top plan view of still another LED light engine module with a different quick-release feature according to another exemplary embodiment of the disclosure.
Figure 33:
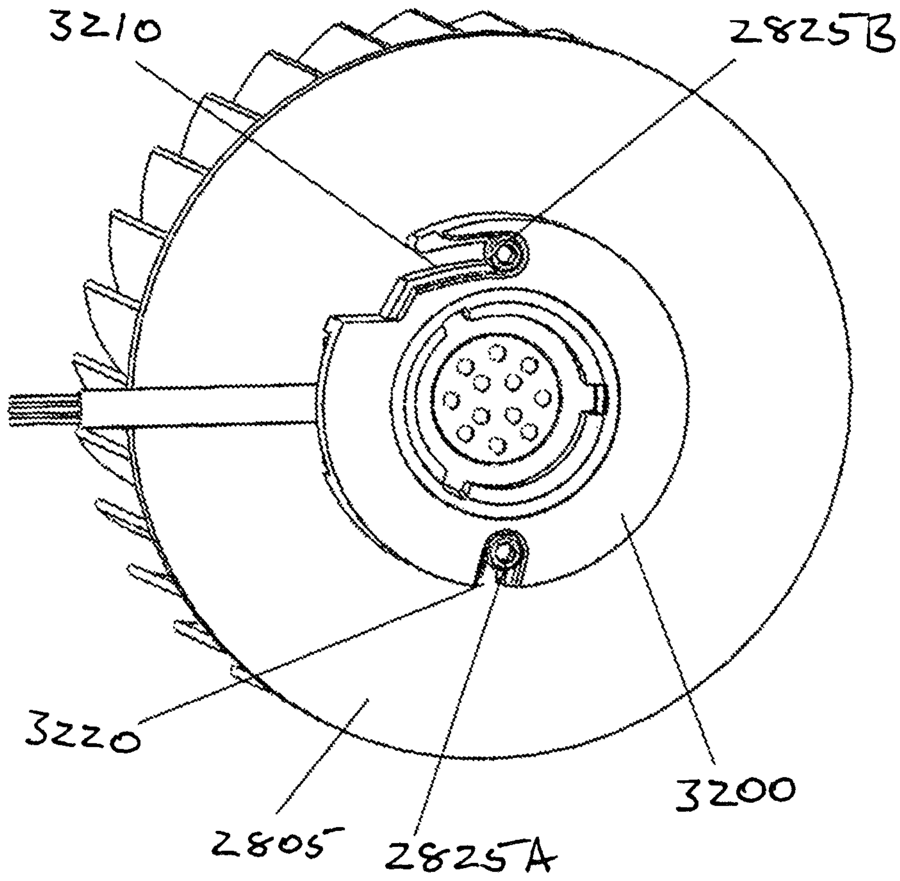
FIG. 33 illustrates an assembly view of a modular LED device with the LED light engine module of FIG. 32 according to yet another exemplary embodiment of the disclosure.

FIGS. 32 and 33 present another alternative exemplary embodiment for the LED module 3200 with another exemplary configuration for the slots 3210, 3220 in accordance with an alternative exemplary embodiment of the disclosure. Now referring to FIGS. 32 and 33, the exemplary LED module 3200 includes one straight slot 3220 and one arcuate slot 3210. In one exemplary embodiment, the straight slot 3220 is straight or substantially straight and terminates after passing through the outer perimeter of the outer housing 2850 of the LED module 3200. In an alternative embodiment (not shown), the slot 3220 includes a keyhole instead of allowing the screw 2825A to exit the outer housing 2850 of the LED module 3200. In certain exemplary embodiments, a portion 3230 of outer housing 2850 is also removed adjacent to one end of the arcuate slot 3210. In one exemplary embodiment the dimensions of the slots 3210, 3220 and the keyhole (if any) with respect to the screws 2825 are the same as or substantially similar to that described above with reference to FIG. 28 and will not be repeated herein.

In use, the LED module 3200 is capable of being removed from the heat sink 2805 and replaced by loosening the screws 2825 and rotating the LED module 3200 in a clockwise manner about an axis through or adjacent to the screw 2825A so that the screw 2825B rotates out of the arcuate slot 3210, as shown in FIG. 33. Once the screw 2825B is out of the slot 3210, then the LED module 3200 is slid in a direction so that the screw 2825A slides out of the slot 3220 to an exterior of the outer housing 2850. The LED modules 3200 can then be moved from the planar surface of the heat sink 2805. Securing the LED module 3200 to the heat sink 2805 can be achieved by reversing the steps provided above. While the exemplary embodiment of FIGS. 32 and 33 describes a method of first turning the module 3200 in a clockwise manner for removal, by positioning the slots in a opposite manner, the removal process could then be completed by first rotating the module 3200 in a counter-clockwise manner.

Figure 34:
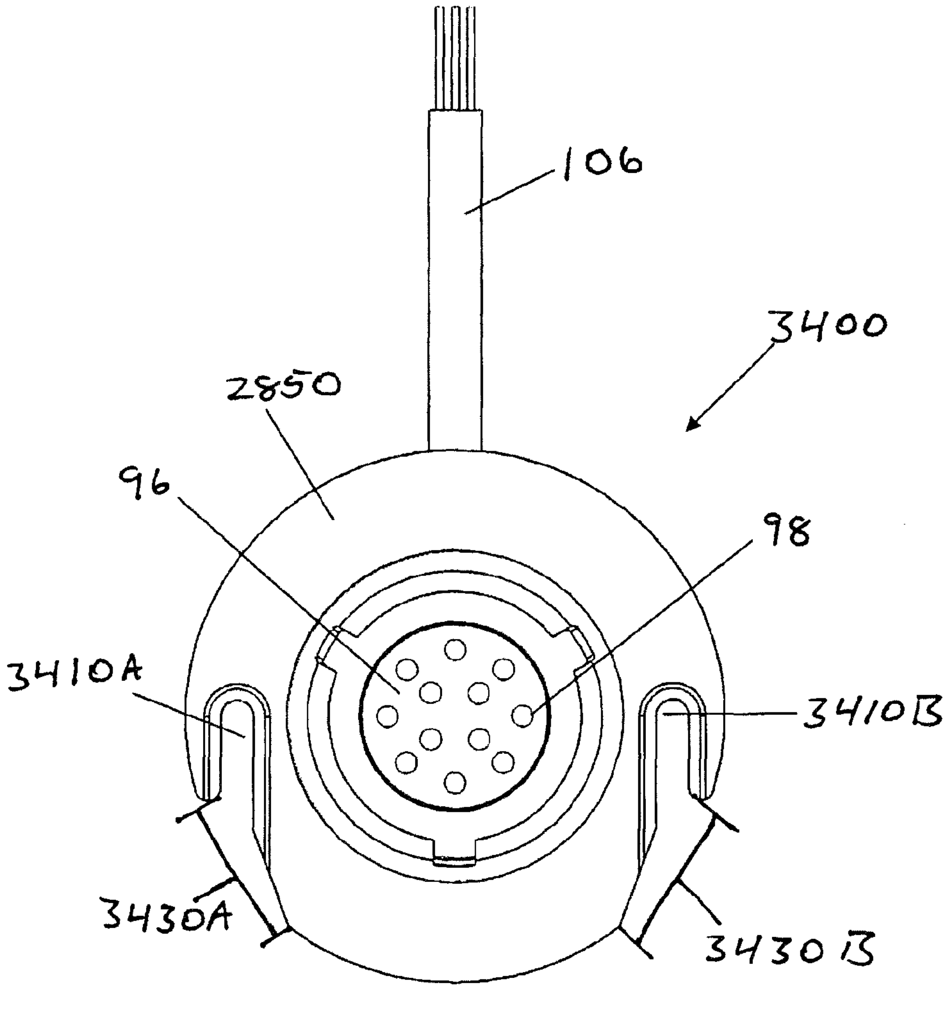
FIG. 34 illustrates a top plan view of another LED light engine module with yet another quick-release feature according to another exemplary embodiment of the disclosure.
Figure 35:
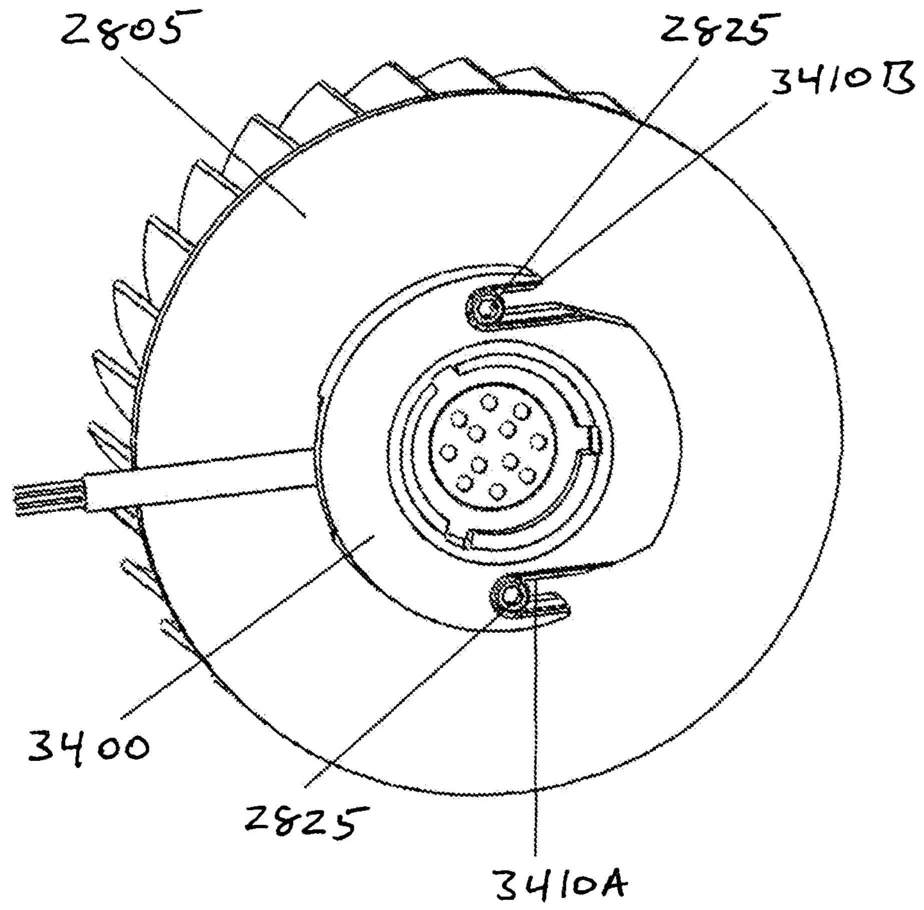
FIG. 35 illustrates an assembly view of still another modular LED device with the LED light engine module of FIG. 34 according to still another exemplary embodiment of the disclosure.

FIGS. 34 and 35 present another alternative exemplary embodiment of a quick-release feature for removing an LED module 3400 from a heat sink 2805 by providing another exemplary configuration for the slots 3410. Referring now to FIGS. 34 and 35, the exemplary LED module 3400 includes two straight or substantially straight slots 3410A-B. In one exemplary embodiment the dimensions of the slots 3410A-B with respect to the screws 2825 are the same as or substantially similar to that described above with reference to FIG. 28 and will not be repeated herein. In one exemplary embodiment, the two slots 3410A-B each have longitudinal axes that are parallel or substantially parallel with one another.

In one exemplary embodiment, one or both of the slots 3410A-B is straight or substantially straight and terminates after passing through the outer perimeter of the outer housing 2850 of the LED module 3400. In an alternative embodiment (not shown), each of the slots 3410A-B includes a keyhole instead of allowing the screw 2825 to exit the LED module 3400. In certain exemplary embodiments, a portion 3430A, 3430B of the outer housing 2850 of the LED module 400 is also removed adjacent to one end of each of the slots 3410A-B. In one exemplary embodiment, removal of the LED module 3400 from the heat sink 2805 is accomplished by loosening the screws 2825 but not removing them from the heat sink 2805 and then sliding the LED module 3400 so that the screws 2825 exit their respective slots 3410A-B along the perimeter of the outer housing 2850. Securing the LED module 3200 to the heat sink 2805 can be achieved by reversing the steps provided above.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

I claim:

1. An apparatus for illumination, comprising:
- a light emitting diode (LED) module, the LED module comprising:
  - a substrate having a plurality of light emitting diodes;
  - a first set of notches; and
  - a second set of notches, wherein the first set of notches and the second set of notches are formed in an inner circumference of the LED module, wherein each of the first set of notches and the second set of notches includes:
    - a first vertical notch;
    - a second vertical notch; and
    - a horizontal notch connected to the first vertical notch and to the second vertical notch, wherein the first vertical notch has an open end at a face of the LED module, wherein the first vertical notch and the second vertical notch extend in a same direction relative to the horizontal notch; and
- a light reflector attached to the LED module, the light reflector having a first mounting tab and a second mounting tab, wherein the first mounting tab is retained in the second vertical notch of the first set of notches, wherein the first mounting tab is inserted into the horizontal notch of the first set of notches through the first vertical notch of the first set of notches, wherein the second mounting tab is retained in the second vertical notch of the second set of notches, and wherein the second mounting tab is inserted into the horizontal notch of the second set of notches through the vertical notch of the second set of notches.

2. The apparatus of claim 1, wherein the LED module further comprises a third set of notches and wherein the light reflector further comprises a third mounting tab, wherein the third mounting tab is inserted through a vertical notch of the third set of notches.

3. The apparatus of claim 1, wherein the first mounting tab is retained in the second vertical notch of the first set of notches by a horizontal wall of the second vertical notch of the first set of notches and wherein the second mounting tab is retained in the second vertical notch of the second set of notches by a horizontal wall of the second vertical notch of the second set of notches.

4. The apparatus of claim 1, wherein the second vertical notch of each of the first and second sets of notches extends up from the respective horizontal notch and has a closed end that ends before the face of the LED module.

5. The apparatus of claim 1, further comprising at least one biasing mechanism attached to the LED module for mechanically biasing the first and second mounting tabs of the light reflector into the respective second vertical notch.

6. The apparatus of claim 5, wherein the at least one biasing mechanism is in contact with an outside surface of the light reflector and applies an upward biasing force on the light reflector.

7. The apparatus of claim 5, wherein the at least one biasing mechanism includes at least one spring.

8. The apparatus of claim 1, wherein for each of the first set of notches and second set of notches, the first vertical notch is connected to the horizontal notch at a first end of the horizontal notch and wherein the second vertical notch is connected to the horizontal notch at a second end of the horizontal notch, wherein the first end and the second end of the horizontal notch are opposite ends of the horizontal notch.

9. The apparatus of claim 1, wherein the light reflector is attached to the LED module by inserting the first mounting tab and the second mounting tab of the light reflector in the respective first vertical notch through the open end of the respective first vertical notch and rotating the light reflector such that the first mounting tab and the second mounting tab move through the respective horizontal notch to the respective second vertical notch.

10. The apparatus of claim 1, further comprising:
- a back heat sink in thermal communication with the LED module; and
- a front heat sink attached to and in thermal communication with the back heat sink, wherein the front heat sink surrounds an outer surface of the light reflector.

11. An apparatus for illumination, comprising:
- a light emitting diode (LED) module, the LED module comprising:
  - a substrate having a plurality of light emitting diodes;
  - a first set of notches; and
  - a second set of notches, wherein the first set of notches and the second set of notches are formed in an inner circumference of the LED module, wherein each of the first set of notches and the second set of notches includes:
    - a first vertical notch;
    - a second vertical notch; and
    - a horizontal notch connected to the first vertical notch and to the second vertical notch, wherein the first vertical notch has an open end at a face of the LED module, wherein the first vertical notch and the second vertical notch extend in a same direction relative to the horizontal notch; and
- a light reflector designed for attachment to the LED module, the light reflector having a first mounting tab and a second mounting tab, wherein the first mounting tab is designed to be retained in the second vertical notch of the first set of notches, wherein the first mounting tab is designed for insertion into the horizontal notch of the first set of notches through the first vertical notch of the first set of notches, wherein the second mounting tab is designed to be retained in the second vertical notch of the second set of notches, and wherein the second mounting tab is designed for insertion into the horizontal notch of the second set of notches through the first vertical notch of the second set of notches.

12. The apparatus of claim 11, wherein the LED module further comprises a third set of notches and wherein the light reflector further comprises a third mounting tab, wherein the third mounting tab is designed to be inserted through in a vertical notch of the third set of notches.

13. The apparatus of claim 11, wherein the first mounting tab is designed to be retained in the second vertical notch of the first set of notches by a horizontal wall of the second vertical notch of the first set of notches and wherein the second mounting tab is designed to be retained in the second vertical notch of the second set of notches by a horizontal wall of the second vertical notch of the second set of notches.

14. The apparatus of claim 11, wherein the second vertical notch of each of the first and second sets of notches extends up from the respective horizontal notch and has a closed end that ends before the face of the LED module.

15. The apparatus of claim 11, further comprising at least one biasing mechanism attached to the LED module for mechanically biasing the first and second mounting tabs of the light reflector into the respective second vertical notch.

16. The apparatus of claim 15, wherein the at least one biasing mechanism is designed be in contact with an outside surface of the light reflector and to apply an upward biasing force on the light reflector.

17. The apparatus of claim 15, wherein the at least one biasing mechanism includes at least one spring.

18. The apparatus of claim 11, wherein, for each of the first set of notches and second set of notches, the first vertical notch is connected to the horizontal notch at a first end of the horizontal notch and wherein the second vertical notch is connected to the horizontal notch at a second end of the horizontal notch, wherein the first end and the second end of the horizontal notch are opposite ends of the horizontal notch.

19. The apparatus of claim 11, wherein the light reflector is designed to be attached to the LED module by inserting the first mounting tab and the second mounting tab of the light reflector in the respective first vertical notch through the open end of the respective first vertical notch and by rotating the light reflector such that the first mounting tab and the second mounting tab move through the respective horizontal notch to the respective second vertical notch.

20. The apparatus of claim 11, further comprising:

a back heat sink designed to dissipate heat from the LED module; and a front heat sink designed to be positioned around the light reflector.

* * * * *